United States Patent [19]

McCoy

[11] 4,393,394

[45] Jul. 12, 1983

[54] TELEVISION IMAGE POSITIONING AND COMBINING SYSTEM

[76] Inventor: Reginald F.H. McCoy, 1354 NE. 31st Pl., Gainesville, Fla. 32601

[21] Appl. No.: 293,525

[22] Filed: Aug. 17, 1981

[51] Int. Cl.³ .......................................... H04N 9/535
[52] U.S. Cl. ...................................... 358/22; 358/183
[58] Field of Search ................................. 358/22, 183

[56] References Cited

U.S. PATENT DOCUMENTS

| | | | |
|---|---|---|---|
| 2,974,190 | 3/1961 | Geiger | 358/22 |
| 3,697,681 | 10/1972 | McCoy | 358/22 |
| 4,035,832 | 7/1977 | Stalley | 358/8 |
| 4,092,673 | 5/1978 | Adams | 358/183 |
| 4,200,890 | 4/1980 | Inaba | 358/183 |
| 4,202,008 | 5/1980 | King | 358/22 |
| 4,292,649 | 9/1981 | Macheboeuf | 358/22 |
| 4,296,434 | 10/1981 | Drewery et al. | 358/22 |
| 4,319,266 | 3/1982 | Bannister | 358/22 |

Primary Examiner—Michael A. Masinick

[57] ABSTRACT

Method for producing a background television image which moves corresponding to motion of a camera viewing a foreground scene, the image of which is to be combined with the background image by chroma-key, thus creating the appearance that both background and foreground are viewed by the same camera, although the background actually originates from separate cameras or recordings. Employs multiple cameras, or a single anamorphic camera with subsequent electronic horizontal expansion of the image, or recordings therefrom, to form the background image which can then be displaced in position, by variation of synchronizing pulse timings, while continuing to fill the full screen area. Also employs a backing for the foreground scene including a distinctive marker, the position of which in the foreground image is detected and used to control the position of the background image.

13 Claims, 28 Drawing Figures

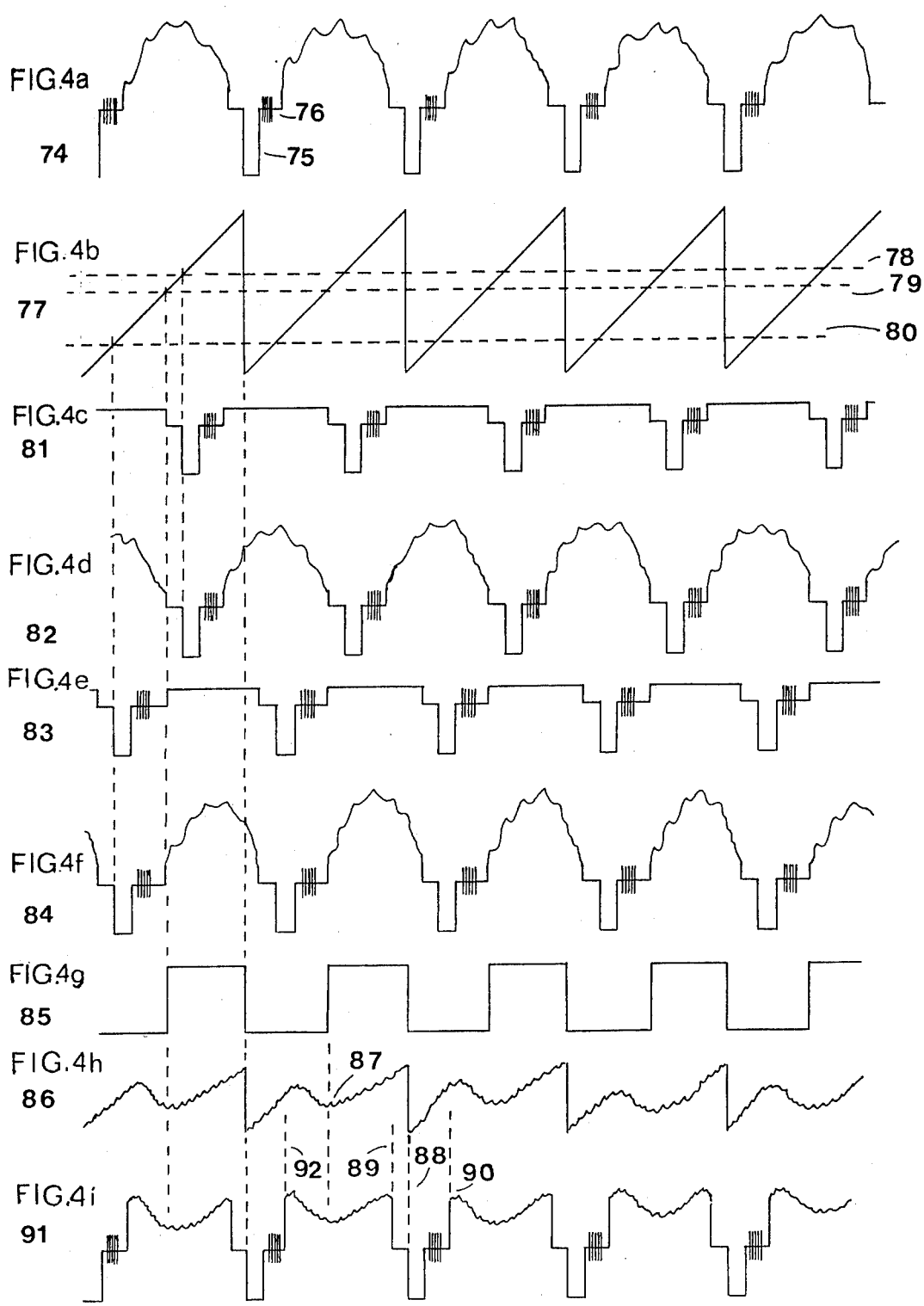

TELEVISION IMAGE POSITIONING AND COMBINING SYSTEM

BACKGROUND OF THE INVENTION

This invention relates to the production of television images for use with chroma-key, a known technique in which foreground subjects are located in front of a backing of a particular color the presence of which is detected in a television image and caused to substitute a different television image of a background scene to produce the effect that the subjects are located in front of this background. Such a technique is described in U.S. Pat. No. 2,974,190.

A major drawback to the present use of chroma-key is that if the camera is moved to follow motion of the subjects the image of the background remains stationary, producing an artificial effect of the subjects floating in front of the background image.

This invention aims to provide a background image, which may include moving objects, which will follow motion of the foreground camera so that it appears to be viewed by this camera.

Prior efforts to produce this result have used a photographic background mounted on a movable easel which is servo-controlled to follow motions of the camera. Such a system is described in U.S. Pat. No. 4,202,008. This is obviously limited to still backgrounds. A version of this system using a servo-controlled motion-picture projector as background image source is also described in this patent. This approach is limited by the area of the scene included in the film frame, and by jitter of the motion-picture image. Other efforts to produce the desired effect have employed an electronic frame store capable of repositioning a television image. A system of this type is described in U.S. Pat. No. 4,200,890. Frame stores are expensive and introduce delay which causes motion of the image to lag behind motion of the foreground camera. Also the field of view is limited to that contained in the television image, consequently moving this image leaves a blank area at one or other side. This restricts use to cases where the repositioned image does not fill the full width and height of the final combined image, such as a chroma-key insert into a scene, as referred to in the referenced U.S Patent.

SUMMARY OF THE INVENTION

It is the object of this invention to provide a system in which a television image of a background is caused to move in correspondence with the motions of a television camera viewing a foreground subject so as to create the appearance, when the image formed by the camera is combined with the background image, that the subject is located in front of the background and being viewed by the same camera.

A feature of this invention is that the background image may be a composite of images originating from two television cameras which provide slightly overlapping views of the background scene with a total area greater than that used in the composite image at any one time. The images from these cameras (or recordings of these images) are positioned so that corresponding details in the overlap areas are aligned. Switching between the signals from the cameras within the overlap area then produces the appearance of a continuous picture. Equal displacements of the positions of the images from these cameras then makes visible parts not previously included in the composite image.

According to this invention television images are displaced in position by changing the timings of the synchronizing pulses supplied to the cameras by controlled amounts. This method of repositioning television images may also be used with video recorders.

Another feature of this invention is that compensating distortions of the images may be produced by variable timings of the synchronizing pulses to correct for geometrical errors in the cameras, to produce precise alignment in the overlap areas.

Another feature of this invention is that motion of the camera viewing the foreground subject may be measured by placing the subject in front of a backing having areas of two different colors. For example the backing may be colored dark blue with a vertical stripe of light blue. The times at which transitions between signals corresponding to these two colors occur in the camera output indicate the position of the stripe in the camera image. This position can then be used to control the position of the background image, which will thus move whenever the camera pans (rotates about a vertical axis) with the exact amount of movement to create the impression that the background is viewed by this camera.

A further feature of this invention is that the background image may originate from a camera which forms an image compressed horizontally, which is subsequently expanded electronically. This enables the camera to cover a wider field of view than is displayed at any one time so that the image may be displaced horizontally without loss of picture at one or other side. A method for achieving electronic horizontal expansion of a television image for this application is described.

DESCRIPTION OF THE DRAWINGS

The invention, both as to its organization and method of operation, together with further objects and advantages thereof, will best be understood with the aid of the following specification and attached drawings wherein:

FIGS. 4a, 4b, 4c, 4d, 4e, 4f, 4g, 4h, and 4i show waveforms occurring at points within the system shown in the block diagram of FIG. 3;

DETAILED DESCRIPTION OF THE PREFERRED EMBODIMENT

Figure 1:
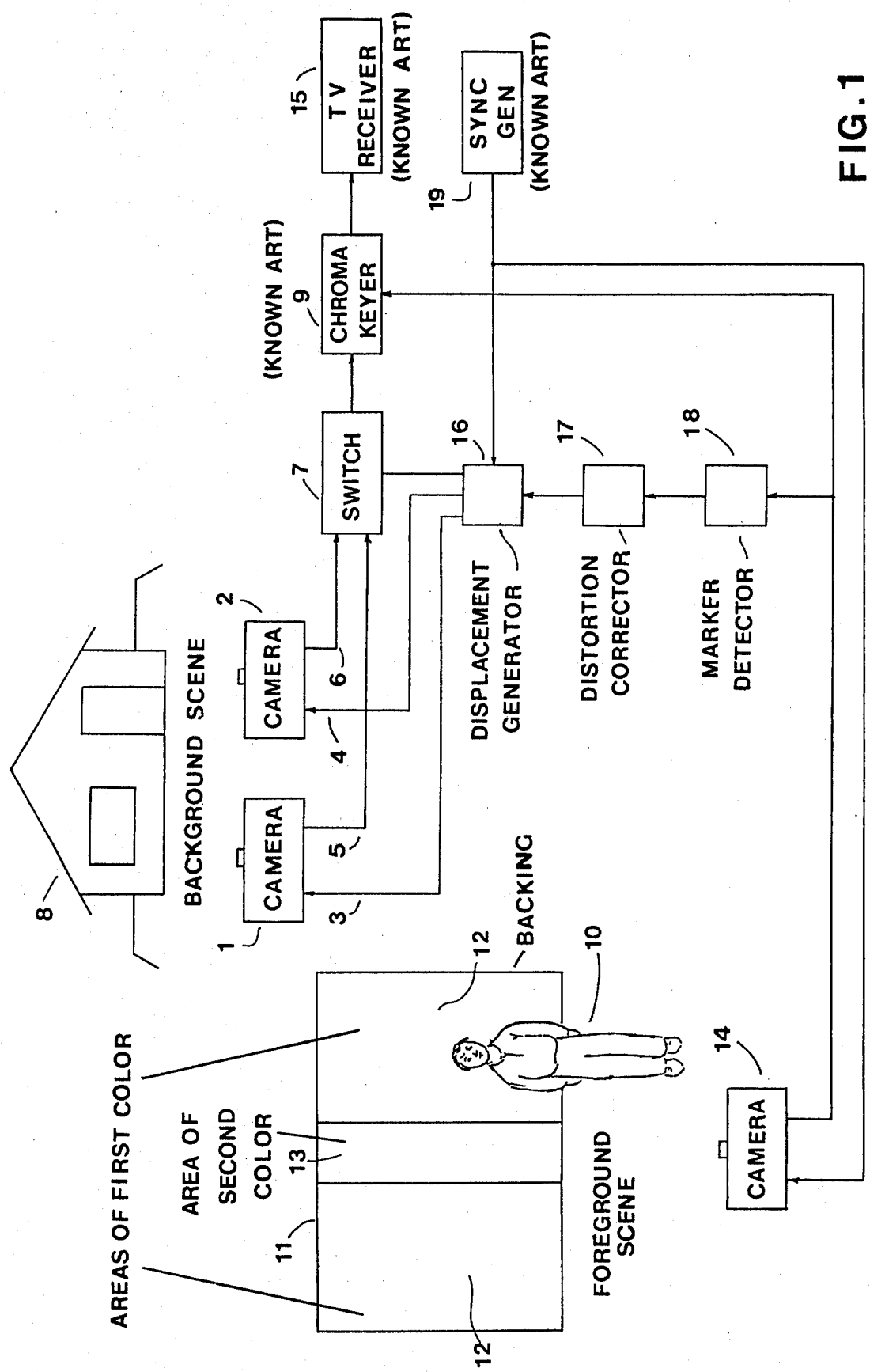
FIG. 1 is a general block diagram showing the method of operation of the invention.

Referring now to the drawings, and in particular to FIG. 1, there is illustrated a typical embodiment and application of this invention in which television cameras 1 and 2 are positioned so as to view horizontally adjacent and overlapping areas of scene 8, which is shown as a hypothetical example of a possible background scene to be used in forming a television picture and the content of which is not relevant to the operation of this invention. Television cameras 1 and 2 may be of any known form, for either color or monochrome operation, in which an image is scanned and an electrical signal or signals representative of this image are generated according to normal television practice, the time of scanning being controlled by reference synchronizing signals here shown being supplied to cameras 1 and 2 by lines indicated as 3 and 4 respectively.

The output signals, hereinafter referred to as video signals, from cameras 1 and 2, are supplied as inputs to electronic switch 7 as shown by lines 5 and 6 respectively. The function of switch 7 is to select one or other of its two inputs, as determined by a control signal. Electronic switch 7 may comprise any of known circuits or devices for selecting between two video signal inputs under control of a third input which varies between two states at a rapidly-changing rate. The output of electronic switch 7 is supplied as the background video input to chroma-keyer 9 which itself is known art.

Also in FIG. 1 there is shown at 10 an example of a foreground subject, the form of which is not relevant to this invention, placed in front of a backing 11, having areas 12 of a first color which may be, but is not limited to, dark blue, and another area 13 of a second color, which may be but is not limited to, light blue, configured such that the boundaries between areas 12 and 13 are vertical straight lines. The scene comprising subject 10 and backing 11 is viewed by television camera 14 which may be any known form of color television camera capable of distinguishing between the colors of areas 12 and 13, and between those colors and the color or colors of foreground subject 10.

The video signal from camera 14 is supplied to chroma-key equipment 9 as its foreground video input. The principle of chroma-key and the design of chroma-key equipment is known art. Briefly such equipment detects the color of the backing in the foreground video input and, when this color is detected, substitutes the background video input. At other times it passes the foreground video to its output. The result is that the output, when displayed on a television screen, produces a picture in which the foreground subject appears in front of the background scene.

For the purposes of the present invention chroma-key equipment 9 must be so adjusted that it accepts both colors of areas 12 and 13 as being the color of the backing. This is normally possible provided that the difference between the two colors employed is not large.

The output of chroma-key equipment 9 is shown as being supplied to television receiver 15. It is to be understood that any form of television transmission, broadcasting, or recording system, not forming part of this invention, may be interposed between chroma-key equipment 9 and television receiver 15, and any number of television receivers may be used.

It will be apparent from the above description that the picture displayed on television receiver 15 will comprise a view of subject 10 appearing in front of a background composed of portions of the views of scene 8 observed by cameras 1 and 2, the selection between these two views being determined by the control input to switch 7.

The novelty of this part of this invention lies in the use of multiple cameras, as at 1 and 2, to view the background scene, with their outputs combined by switch 7, and more particularly in the inclusion and functioning of displacement generator 16, distortion corrector 17, and marker detector 18. It is to be understood that each of these items, that is the displacement generator, distortion corrector, and marker detector, is a distinct and novel feature of this invention, which may be used independently or in combination as is to be described.

The function of marker detector 18 is to sense the position at which stripe 13 in backing 11 appears in the television image formed by camera 14 and to generate a control voltage corresponding to this position, which is then supplied to distortion corrector 17.

Distortion corrector 17 provides three outputs of this control voltage to control the horizontal positions of the images from cameras 1 and 2, by way of displacement generator 16, and to control the switching time of switch 7, also by way of separate circuits conveniently incorporated in displacement generator 16. To each of these three outputs is added an individually adjustable d.c. voltage so that the initial positions of the images from cameras 1 and 2 and the initial timing of occurrence of switching between the signals from cameras 1 and 2 by switch 7 may be separately set. To the outputs which control the horizontal positions of the images from cameras 1 and 2 there are also added waveforms at the vertical scanning rate which may be adjusted to correct for geometric distortions of the images generated by cameras 1 and 2.

The three outputs of distortion corrector 17 are supplied to displacement generator 16 in which they are employed to control the timings of the horizontal synchronizing pulses supplied as reference signals to cameras 1 and 2, thus controlling the horizontal positions at which the images generated by these cameras will appear on a television screen, and also to control the times at which switch 7 switches between the signals from cameras 1 and 2. Displacement generator 16 also conveniently includes circuits for generating standard synchronizing, blanking, and color burst waveforms which are then included with the output of switch 7. Synchronizing pulses from synchronizing pulse generator 19 are supplied to displacement generator 16 and camera 14 in order that the inputs to switch 7 shuld be synchronous with each other and with other sources that may be used in a television installation.

The result of the combined action of marker detector 18, distortion corrector 17 and displacement generator 16, together with switch 7 is to produce a composite background image derived from cameras 1 and 2, the position of which, as displayed on a television screen, bears a constant relation to the position of stripe 13 in the image formed by camera 14. As camera 14 pans (rotates about a vertical axis), the background image will move in exact correspondence with the motion of the image of stripe 13 in the image formed by camera 14.

The foreground image from camera 14 and the composite background image from the output of switch 7 are combined by chroma-key equipment 9, not of itself a part of this invention, to provide an image in which foreground subject 10 appears in front of the composite background image of scene 8 and in which as camera 14 pans it appears that both foreground and background are being viewed by camera 14.

The concepts and functionings of the displacement generator, distortion corrector, and marker detector will now be discussed and examples given of methods and circuits which may be employed for their implementation.

The function of displacement generator 16 is to produce electrically controllable displacements of the positions in which the images generated by cameras 1 and 2 will appear when displayed on a television screen. These displacements are effected by controlling the timings of the reference synchronizing signals supplied at 3 and 4 to cameras 1 and 2.

A television picture is transmitted and displayed as a sequence of points along a succession of horizontal lines. Because the lines and the individual points along each line are displayed in time sequence it is necessary, in any installation in which television images from several sources are to be combined, that the sources should be synchronous, that is, that each source should be generating the signal corresponding to the same point within the image at the same time, at the point in the system where they are to be combined.

To establish this synchronism it is normal practice, in broadcast and other installations having multiple television signal sources, to supply each source with synchronizing pulses originated by a common generator. Video signals generated by cameras or other sources also normally include synchronizing pulses, derived from the pulses originated by the common generator, for the purpose of synchronizing receivers or other display devices.

Such a synchronizing pulse generator, which is known art, is shown at 19 in FIG. 1.

A video signal originated by the common generator (frequently a signal corresponding to an all-black image, although any signal may be used) may be distributed to all the cameras and other signal sources, which then extract the synchronizing pulses from this signal and use them to synchronize the source's own output.

Some cameras utilize separate horizontal and vertical pulses, also obtained from the common generator.

It is well known to those skilled in the art that, if the synchronizing pulses supplied to any particular camera are differently timed to those included in the final video signal output of the television installation, the image from that camera will be displayed on the receivers with a displacement from its original position.

Figure 2:
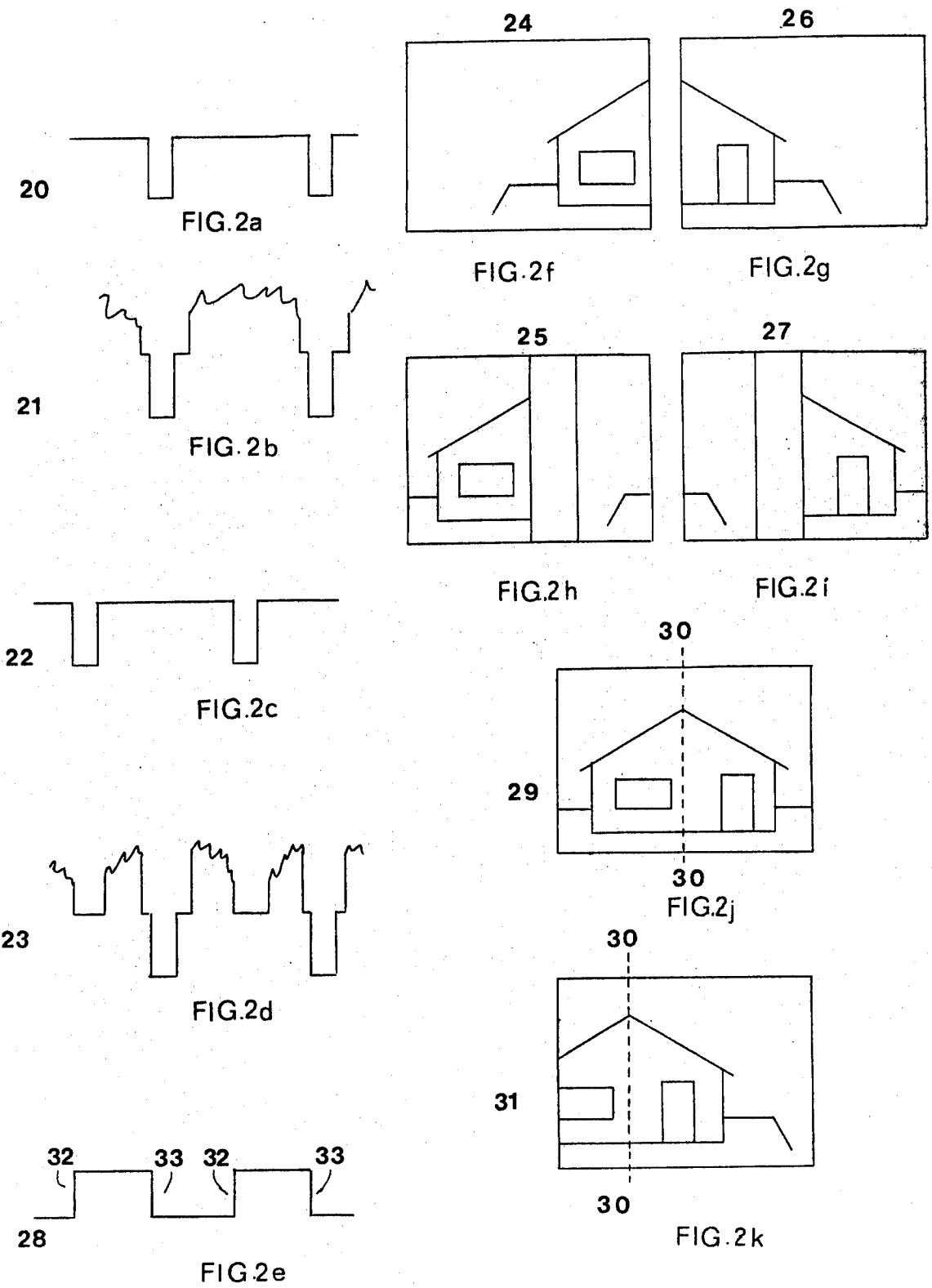
FIGS. 2a, 2b, 2c, 2d, 2e, 2f, 2g, 2h, 2i, 2j, and 2k show television images of a hypothetical scene and associated waveforms.

Referring to FIG. 2a, at 20 are shown the horizontal synchronizing pulses as they would normally be supplied to synchronize a camera, and, in FIG. 2b, at 21 is shown a simplified representation of the video output waveform from that camera. It will be noted that the synchronizing pulses contained in waveform 21 are coincident with the pulses shown at 20.

In FIG. 2c, at 22 are shown the pulses as at 20 but advanced in time. In FIG. 2d, at 23 is shown the video waveform from a camera supplied with the pulses shown at 22 as it would appear at the output of a television installation where synchronizing pulses have been inserted unchanged in time with respect to those shown at 20.

The result of advancing the synchronizing pulses supplied to the camera is that, at the time the receiver is starting to display the image at the left-hand side of the screen, the camera has already scanned a part of the scene and is generating the signal corresponding to points nearer the center of the scene. This is illustrated in FIG. 2f, at 24 and in FIG. 2h, at 25, where 24 is a representation of the image of scene 8 which would be produced on a television screen by the signal from camera 1 if it were supplied pulses 20 as its reference synchronizing signal, and 25 is a representation of the image which would be produced, without any change in the orientation of the camera, if it were instead supplied with pulses 22 as reference signal.

It can be seen that at the left-hand side of representation 25 there appears that part of the image which was near the center in representation 24. A blank bar appears in representation 25; this corresponds to the time when the camera has completed scanning one line and is blanked preparatory to starting to scan the next line. The part of the scene which originally appeared at the left side now appears to the right of the blank bar. The picture has been displaced to the left as displayed on the television screen with the part that was originally at the left being separately displayed at the right.

By delaying instead of advancing the synchronizing pulses the picture will be displaced to the right. In FIG. 2g, at 26 is shown a representation of the image of scene 8 which would be produced by the signal from camera 2 if supplied with pulses 20 as its reference input, and in FIG. 2i, at 27 is shown a representation of the image from the same camera, unchanged in orientation, as it would appear if its reference synchronizing pulses were delayed.

If a control signal such as shown in FIG. 2e, at 28 is now supplied to electronic switch 7 it will select the left part of the image 25 produced by camera 1 and the right part of the image 27 produced by camera 2, and its output, when displayed on a television screen, will appear as represented in FIG. 2j, at 29 in which that part to the left of line 30 is derived from camera 1 and that part to the right of line 30 is derived from camera 2. By appropriate adjustment of the timings of the synchronizing pulses and hence the positions of the images from the two cameras the details of the original scene, 8, in the image derived from camera 1 at the position of line 30 can be made to correspond with the same details of scene 8 as viewed by camera 2 and also appearing at the position of line 30. The appearance is then obtained of a single continuous image. To obtain accurate alignment of the two sections of image 29 it is necessary that the two camera images be correctly positioned both horizontally and vertically. It will be apparent that the method described for displacing the camera images horizontally by advancing or delaying the horizontal synchronizing pulses may also be applied to producing vertical displacements by advancing or delaying the vertical synchronizing pulses. However it is preferable that the directions of viewing of cameras 1 and 2 should be carefully aligned to the same vertical angle so that timing changes required of the vertical synchronizing pulses may be kept to a minimum, inasmuch as in the configuration of FIG. 1 no picture information is available for areas above and below the fields of view of the two cameras, hence a vertical displacement of one or other image would leave a blank area at top or bottom of the part of the composite image derived from the camera whose image had been displaced.

If now an additional timing change, either advancing or delaying, is applied to the horizontal synchronizing pulses supplied to both cameras 1 and 2, both images will be displaced by equal amounts and their alignment at the junction line in the composite image will not be affected. However such an added timing change, equal for both cameras, will result in the whole composite image being horizontally displaced as shown in FIG. 2k, at 31, with more of the image from one camera and less of the image from the other camera becoming visible. In order that the junction line 30 between the two camera images should continue to correspond to the same points in the images the transitions 32 of control signal 28 must also be changed in time by an amount equal to the chage in the synchronizing pulses. Note that the other transitions, 33, of control signal 28 are timed to occur within the horizontal blanking period of the video system, which is fixed in time relative to the original synchronizing pulses 20.

It is thus possible to produce a composite image, as shown in examples 29 and 31 the position of which, when displayed on a television screen, may be varied by control of the timings of synchronizing pulses, and when so varied will bring into view areas of the scene not previously included in the image (as will be apparent by comparison of examples 29 and 31) without having a blank area at one or other side of the image as would have occurred had only one camera image been utilized.

By comparison of examples 29 and 31 it can be seen that the overall effect is the same as would be produced had the scene been viewed by a single camera which was then panned to the right. Clearly displacing the two camera images and the switching line in the opposite direction will yield the effect of panning to the left.

We thus have a means of electronically achieving the effect of panning a camera, without requiring any physical movement of the cameras actually used.

Moreover, the outputs of cameras 1 and 2 of FIG. 1 may be separately recorded, for example, on video tape. In this case the reference synchronizing signals with advanced or delayed timing produced by displacement generator 16 are supplied, not to the cameras as shown in FIG. 1, but instead to the video tape machines when they are reproducing the two tape recordings. (With some video tape recorders the synchronization function is performed by an auxiliary device known as a timebase corrector to which the reference signals are supplied; for the purpose of this invention this may be considered part of the video tape recorder).

This application of this invention may readily be understood by considering that in the configuration illustrated in FIG. 1 the video outputs of cameras 1 and 2 are supplied, not to switch 7, but instead each to its own video recorder. The reference signals 3 and 4 shown as supplied to cameras 1 and 2, may then be taken directly from synchronizing pulse generator 19, although when a camera feeds a video recorder and no requirement exists at the time for combining images from different cameras the use of external reference signals is not always necessary.

At a subsequent time the recordings so made may be played back. The video outputs from the two recorders are then supplied to switch 7 in place of the video outputs of the two cameras, and the reference signals from displacement generator 16 are supplied one to each recorder. The effect is then obtained of being able to displace the position of the composite image formed by switch 7 in the same way as if the camera video signals had been used directly. We thus have a means of achieving the effect of panning a camera at a time subsequent to that at which the cameras were in use.

The maximum displacement of position that can be effected with the use of two cameras without the introduction of blank areas is of course limited by the total field of view of the two cameras.

It will be apparent that in addition to, or in place of, cameras set to view parts of the scene which are horizontally separated, cameras may be used which are set to view parts of the scene which are vertically separated. In this case the displacement generator 16 of FIG. 1 is arranged to vary the timing of the vertical synchronizing pulses and the control signal supplied to switch 7 is arranged so that it will switch between its two inputs along a controllable horizontal line. The effect of tiling a camera, that is rotation about a horizontal axis normal to its line of sight, can now be obtained without physical movement of the cameras actually employed.

One method of implementation of displacement generator 16 will now be described. It is to be understood that any method for producing an advance or delay in the timing of synchronizing pulses may be employed and that this invention is not restricted to the use of the method now to be described.

Figure 3:
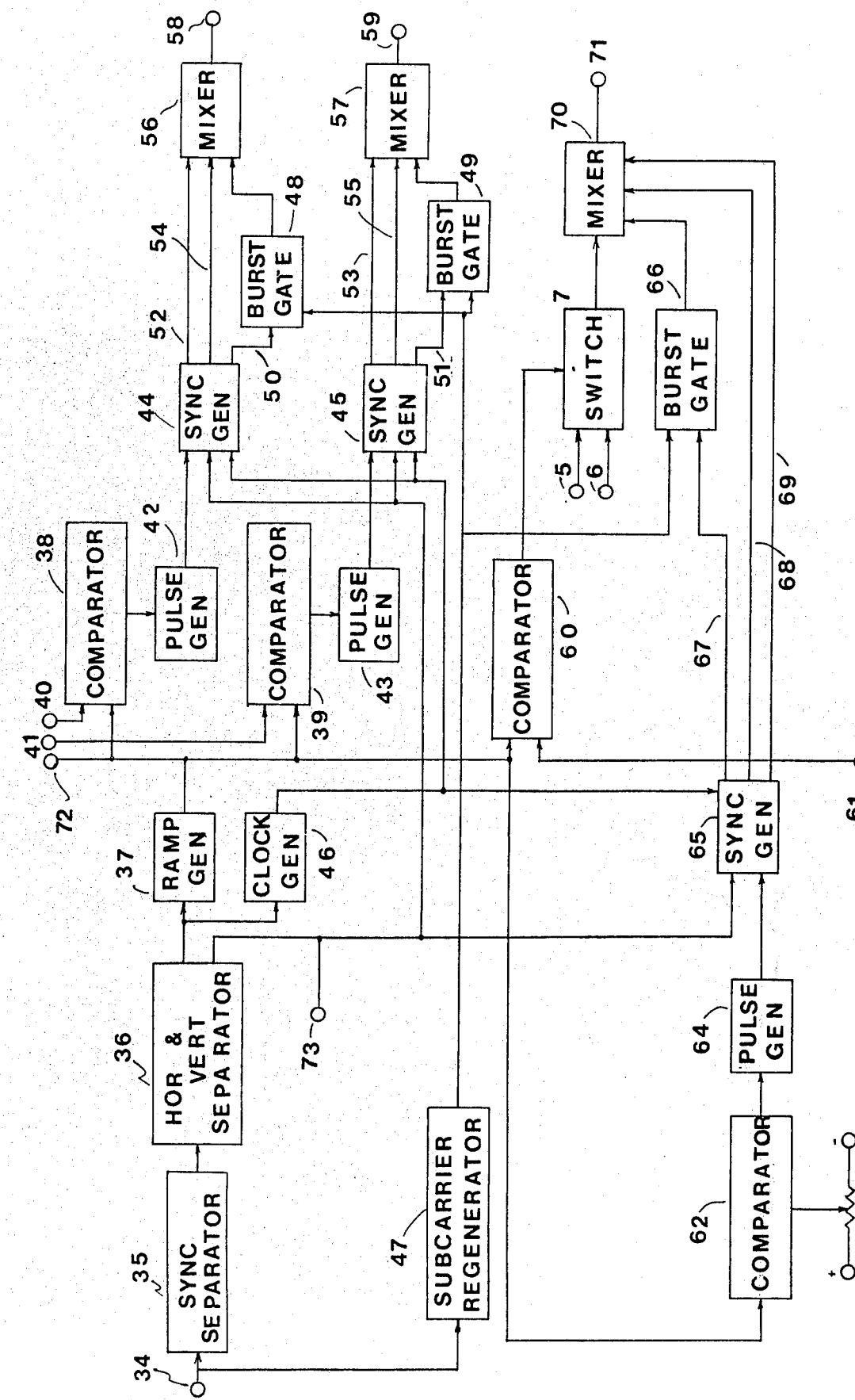
FIG. 3 is a block diagram showing one method of implementation of a means for displacing television images.

FIG. 3 shows a block diagram in which a reference video signal containing synchronizing pulses, derived from the television installation's common synchronizing pulse generator shown at 19 in FIG. 1, is applied at input terminal 34. At 35 is a synchronizing pulse separator circuit which selects the synchronizing pulse part of this video signal, followed at 36 by a circuit to separate the horizontal and vertical components of the synchronizing pulse waveform. Such circuits are known art.

The horizontal synchronizing pulses are applied to a ramp generator 37, which produces a sawtooth waveform, repeating at the rate of the horizontal pulses. This sawtooth waveform is applied as one input to two separate comparators, 38 and 39. The outputs of these comparators change between a low voltage level and a high voltage level when the voltage level of the sawtooth input crosses the voltage level applied to the other input of each comparator. These other inputs are supplied with control inputs 40 and 41, the derivation of which is described subsequently.

The outputs of the comparators are supplied to pulse generators 42 and 43 which produce pulses of similar width to the horizontal synchronizing pulses.

Where the cameras used require separate horizontal and vertical synchronizing pulse inputs, the outputs of pulse generators 42 and 43 may be supplied separately to the horizontal pulse inputs of the two cameras, and the vertical pulse output of separator 36 may be supplied to the vertical pulse inputs of both cameras.

More commonly, cameras require a reference video signal containing the standard composite synchronizing pulse waveform which includes both horizontal and vertical pulses.

Accordingly the outputs of pulse generators 42 and 43 may be fed to synchronizing pulse generators 44 and 45 which generate the standard television synchronizing pulse waveform. Such synchronizing pulse generators are available in the form of integrated circuits (for example, type MM5320 manufactured by National Semiconductor Corporation). The vertical pulse output from separator 36 is also fed to generators 44 and 45. In the output waveform of the generators 44 and 45 the timing of the horizontal component of the composite synchronizing waveform is thus determined by pulse generators 42 and 43 and the timing of the vertical component of the composite synchronizing waveform will be synchronous with the vertical component of the input reference video signal applied at terminal 34.

The synchronizing pulse generators 44 and 45 also require a clock frequency input, at a multiple of the frequency of the horizontal synchronizing pulses. This is generated by frequency-locked oscillator 46. A feed of the horizontal pulses from separator 36 is applied to oscillator 46, which locks it to a multiple of the horizontal pulse frequency. The output of oscillator 46 is fed to both synchronizing pulse generators 44 and 45.

For the correct synchronizing of color cameras the reference video signal supplied to the cameras must also include the standard color synchronizing burst. This occurs shortly after the horizontal pulses in the composite synchronizing waveform. The generators 44 and 45 produce, in addition to the composite synchronizing waveform, a pulse, known as burst flag, which determines when the color synchronizing burst should occur. Since the timing of the horizontal pulses has been changed from that of the input reference signal, applied at 34, by the action of the circuits described above, the required timing of the color burst will also differ from the timing of the burst in the input reference signal.

To provide correct timing of the burst a feed of the input reference video is supplied to subcarrier regenerator 47. This generates a continuous sine wave at color subcarrier frequency, the frequency and phase of which are locked to the color burst of the input video. Commercially available integrated circuits exist to perform this function (for example, type LM3070 manufactured by National Semiconductor Corporation).

The output of subcarrier regenerator 47 is supplied to burst gates 48 and 49. These are also fed from the burst flag pulse outputs 50 and 51 of generators 44 and 45.

The burst flag pulses cause the burst gates 48 and 49 to pass the subcarrier at the required times to form the color burst.

The composite synchronizing pulse outputs 52 and 53 of generators 44 and 45 are supplied to mixers 56 and 57. The synchronizing pulse generators 44 and 45 also generate standard television blanking pulses at outputs 54 and 55 which may also be supplied to mixers 56 and 57. The outputs of burst gates 48 and 49 are also fed to mixers 56 and 57.

Mixers 56 and 57 combine the composite synchronizing pulses, the color burst from burst gates 48 and 49 and the blanking pulses, if needed to produce a black level signal, in the correct proportions to form a standard television video waveform. The outputs of mixers 56 and 57 appear at output terminals 58 and 59, from which they may be fed to the cameras (or other video sources) as the reference inputs to which the cameras will synchronize.

A further feed of the output of ramp generator 37 is taken to a third comparator 60. This is also supplied with a control input applied at terminal 61. As with comparators 38 and 39, the output of comparator 60 will change between a low and high voltage level as the sawtooth waveform from ramp generator 37 crosses the voltage level applied at the control input 61.

The output of comparator 60 forms the control input which is supplied to switch 7 shown in FIG. 1. As previously described the video signals 5 and 6 from the two cameras are supplied to the inputs of switch 7. The result is that the output of switch 7 consists of one of the two video inputs when the output of comparator 60 is at its low level, and changes to the other input when the output of comparator 60 changes to its high level.

The output of switch 7 contains the video information for the combined background image. It is however in practice desirable to add the standard television blanking and synchronizing waveforms, including the color burst, to the output of switch 7 to form a standard television waveform. Inclusion of these waveforms facilitates the use of the signal derived from switch 7 in conjunction with chroma-key equipment 9 which may comprise known and available equipment.

Accordingly a further comparator 62 is also supplied with the sawtooth waveform from ramp generator 37. The reference voltage input to this comparator is supplied from potentiometer 63, which provides an adjustable d.c. voltage. The output of comparator 62 triggers a pulse generator 64 similar to pulse generators 42 and 43.

A further synchronizing pulse generator 65, similar to generators 44 and 45, is provided. Its horizontal input is fed from the output of pulse generator 64, and its vertical input from the vertical pulse output of separator 36, as with generators 44 and 45. The clock frequency from frequency-locked oscillator 46 is also fed to generator 65.

Generator 65 will thus produce composite synchronizing pulses, also blanking pulses and burst flag pulses, whose horizontal timing is determined by the timing of the output of pulse generator 64. This in turn is determined by the timing of the output of comparator 62, which is set by potentiometer 63.

A further burst gate 66, similar to burst gates 48 and 49, is provided. It is fed with the burst flag pulse 67 from generator 65 and with the output of subcarrier regenerator 47, similarly to burst gates 48 and 49. It accordingly generates a color burst correctly timed relative to the composite synchronizing pulses from generator 65.

The combined video output from switch 7 is fed to blanking and sync mixer 70. Also fed to this mixer are the composite synchronizing pulses 68 and the blanking pulses 69 from generator 65, and the color burst from burst gate 66. The action of the blanking and sync mixer 70 is to suppress the video input supplied from switch 7 during the blanking pulses, and at this time to insert the composite synchronizing pulse and the color burst, thus forming a standard composite television waveform, suitable for use in subsequent television equipment.

The output of mixer 70 is fed to terminal 71 for use in the chroma-key equipment 9 which combines the foreground image with the background image.

A further output from ramp generator 37 is supplied to terminal 72 for use with the marker detector to be described, and an output of the vertical pulses from separator 36 is supplied to terminal 73 for use with the distortion corrector also to be described.

It will be clear that, by supplying the ramp generator 37 with the vertical pulses from separator 36, in place of the horizontal pulses, and feeding the outputs of pulse generators 42 and 43 to the vertical pulse inputs of generators 44 and 45 while supplying their horizontal pulse inputs directly from separator 36, the circuit will act to vary the timings of the vertical synchronizing pulses in the reference video outputs 58 and 59 and switch 7 will switch between the two video inputs at a point which can be varied vertically in the image. It is thus possible to displace the background scene vertically. It will further be apparent that a combination of the circuits used to produce horizontal displacement with this capability for producing vertical displacement can be used to provide control of displacement of the combined image in both horizontal and vertical directions. (If ramp generator 37 is fed with vertical pulses, a separate ramp generator, fed with horizontal pulses, must be provided to feed comparator 62).

The action of the circuits described above will now be described with the aid of the drawings FIG. 4a through FIG. 4i. At 74 in FIG. 4a is shown a representation of a standard composite color television waveform, including horizontal synchronizing pulses 75 and color synchronizing burst 76, such as might be supplied to input terminal 34 of FIG. 3.

Waveform 77 of FIG. 4b is a representation of the sawtooth waveform produced by ramp generator 37 of FIG. 3, and it may be seen that the start of the sawtooth is coincident with the start of the horizontal synchronizing pulse of the waveform shown at 74.

Voltage level 78 of waveform 77 corresponds to the level of control input 40 to comparator 38 in FIG. 3.

In FIG. 4c waveform 81 shows the output waveform appearing at terminal 58 of FIG. 3. It will be observed that the timing of the horizontal synchronizing pulses in this waveform is set by the time at which the sawtooth shown at 77 crosses the voltage level shown at 78. This waveform is supplied as the timing reference input 3 to camera 1 of FIG. 1.

In FIG. 4d waveform 82 shows a representation of the video output of camera 1 of FIG. 1, and it can be seen that its horizontal synchronizing pulses have the same timing as in waveform 81.

Voltage level 80 corresponds to the level of control input 41 to comparator 39 in FIG. 3.

In FIG. 4e waveform 83 shows the output appearing at terminal 59 of FIG. 3, and it can be seen that its timing is determined by the sawtooth shown at 77 crossing voltage level 80. This waveform is supplied as timing reference input 4 to camera 2 of FIG. 1.

In FIG. 4f waveform 84 shows a representation of the video output of camera 2 of FIG. 1, having the same timing of the synchronizing pulses as waveform 83.

In FIG. 4g waveform 85 shows the control input applied to switch 7 of FIG. 1. Its timing is determined by the sawtooth shown at 77 crossing voltage level 79. Voltage level 79 is that of the control input 61 supplied to comparator 60 in FIG. 3.

The signal inputs to switch 7 of FIG. 1 are the video outputs of the two cameras, here shown as waveforms 82 and 84.

In FIG. 4h waveform 86 shows the output of the switch 7 from which it can be seen that it switches from waveform 82 to waveform 84 at point 87, coincident with the low level to high level transition of the control input to switch 7, shown at 85.

Waveform 86 reverts to the first input (waveform 82) at point 88 which coincides with the retrace of sawtooth waveform 77. This transition is suppressed by the blanking referred to in the following paragraph and is therefore irrelevant.

In FIG. 4i waveform 91 shows the output of the blanking and sync mixer 70, which appears at terminal 71 in FIG. 3. It can be seen that part of waveform 86, between points 89 and 90 (and including the unwanted transition at 88 in waveform 86), has been suppressed by the blanking pulse applied to mixer 70 of FIG. 3, and the synchronizing pulses and color burst have been inserted in its place. Thus waveform 91 has the form of a standard television waveform.

The start of the synchronizing pulses in waveform 91 is shown as coincident with the start of the pulses in waveform 74. The timing of the pulses in waveform 91 is however adjustable by potentiometer 63 of FIG. 3 and may be set to differ from that of waveform 74 to meet the needs of subsequent equipment if required.

It may be noted at this point that the unused parts of video inputs 82 and 84, including the blanking period with the synchronizing pulse and color burst, are automatically suppressed by the action of the switch. Thus the blank bars and the unwanted parts of the pictures shown at 25 and 27 in FIG. 2 will not appear in the output of the system shown as waveform 91.

It may also be noted that the switching point 87 is shown as coinciding with the end of the video part of waveform 82 and the start of the video part of waveform 84. It may in practice be desirable to provide a slight overlap of the video parts of waveforms 82 and 84, with the switching point 87 occurring between them. This may be achieved by a slight change in either voltage level 78 or voltage level 80, which as has been explained, control the timings of waveforms 82 and 84 respectively.

It will be apparent that, by applying an equal change to voltages levels 78, 79, 80, in either a positive or negative direction, the timings of waveforms 81, 82, 83, 84, 85 and 86 will all shift together, by equal amounts, so that they will continue to bear the same relationship, one to another. However the blanking period between 89 and 90 in waveform 91 will not shift. The result will be that a different part of waveform 86 will appear in waveform 91 between the limits 92 and 89, which define the part of the waveform which will subsequently be displayed on a television screen. Since waveform 86 represents the combined image from the two cameras, the effect is that a different part of this combined image will be displayed on the television screen. That is, by simultaneously varying voltage levels 78, 79, 80, the combined image can be displaced horizontally and different parts of it can be made to appear on the television screen.

It will be understood from the foregoing that the combined image which forms the background scene is formed from the images generated by the two distinct cameras 1 and 2 of FIG. 1.

In order that this combined image should appear continuous, without a visible discontinuity at the point where the electronic switch switches between the two camera signals, it is necessary that the picture details in the two images, formed by the two cameras, should accurately correspond, one with the other, at the point at which the switch between the two camera signals is made.

Practical television cameras frequently suffer from various forms of geometrical distortion the result of which is that the relative positions of objects in the image formed by the camera do not precisely correspond to the relative positions of the corresponding objects in the scene from which the image is derived. Such distortion can prevent the precise correspondence between details at the right hand side of the image from the first camera and the left hand side of the image from the second camera from being obtained.

Figure 5A:
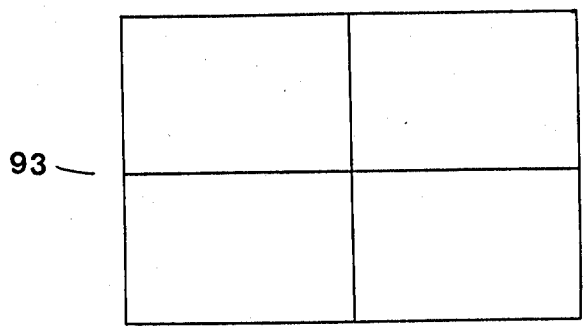
FIGS. 5a, 5b, and 5c show distortions which may occur in images produced by television cameras.
Figure 5B:
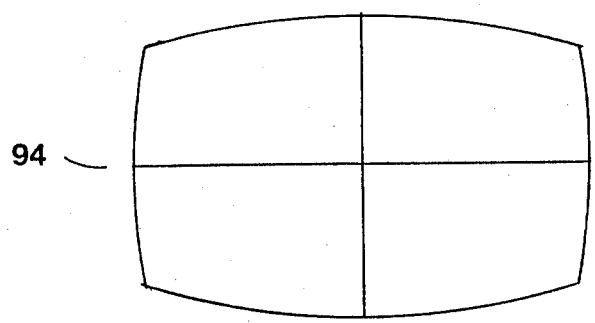
Figure 5C:
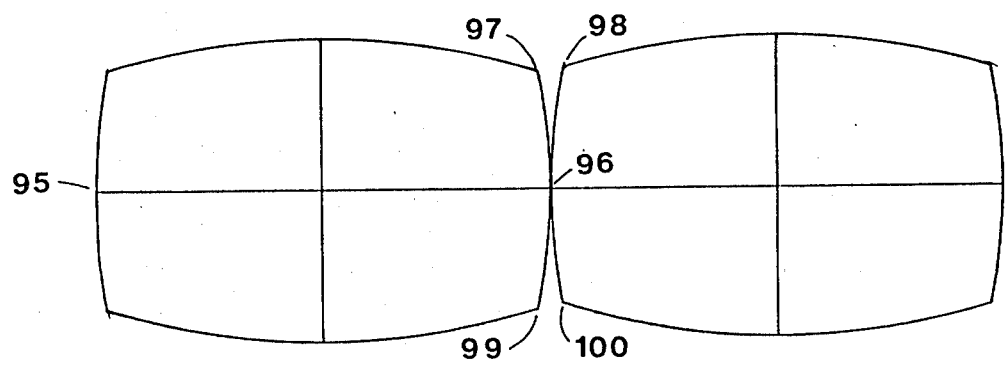

A typical form of such distortion, known as barrel distortion, will be considered. It is assumed that a rectangular grid, as represented in FIG. 5a at 93, forms the original scene. In FIG. 5b at 94 is shown the appearance of the image of this grid produced by a camera suffering from barrel distortion. In FIG. 5c at 95 is shown the appearance of the combined image from two cameras, both having barrel distortion, as it would be formed by the circuits and systems of this invention so far described.

It can be seen that although correspondence of the center parts of the two images is obtainable, as shown at 96, correspondence of points 97 and 98 and likewise 99 and 100 is not obtainable since they are horizontally displaced from their true positions (that is, the positions they would occupy in the absence of the distortion).

It should be noted that vertical displacement of details in one image from the corresponding details in the other image can be corrected by tilting one or other camera, causing an equal vertical displacement of all details in the image from that camera. A vertical displacement which is in one sense (for example, upwards) in one part of the image and in the opposite sense (downwards) in another part of the image, at the line where correspondence of the images is required, can be corrected by changing the magnification of one or other camera, for example by adjustment of a zoom lens as commonly fitted to such cameras. In practice adjustment of the magnification of one camera to obtain correspondence along the switching line will produce an effect on the size of the remainder of the image which is too small to be visually noticeable. These adjustment capabilities will not however correct for horizontal displacements such as those at 97, 98, and 99, 100 of the combined image shown at 95.

It is a further feature of this invention that means may be provided to adjust the relative horizontal positions of parts of the image from a television camera that are separated from each other vertically. Thus a horizontal displacement may be applied to points 97 and 98 to bring them into correspondence, and similarly to points 99 and 100, without affecting the horizontal position of point 96, which already corresponds in its position in the left and right parts of the combined image. This means is referred to as the distortion corrector, which has already been mentioned in connection with FIG. 1 where it is shown included in block form at 17. The method of operation of the distortion corrector and an example of its implementation will now be described.

In the preceding description it was explained that adjustment of the voltage levels 78 and 80 in FIG. 4b would cause the timings of the reference signals 81 and 83 to change with consequent horizontal displacement of the parts of the images from the two cameras as they appear in the combined image formed by signal 91. Voltage level 78 controls the horizontal displacement of the image from the left camera, and voltage level 80 controls the horizontal displacement of the image from the right camera.

Accordingly by varying either voltage level 78 or voltage level 80 dynamically, in synchronism with the vertical scanning of the two cameras, the image from one or other camera can be used to be displayed horizontally by an amount which changes for points vertically separated within the image. By applying this dynamic voltage variation in opposite polarities to the voltage levels 78 and 80 the horizontal displacements of the two camera images will be in opposite directions causing them to move closer together or further apart.

The form of the dynamic voltage variation may be chosen to make points in the two camera images which derive from a single point in the original scene viewed by the cameras coincide horizontally in the combined image, as required at the junction line, if no discontinuity in the combined image is to be seen.

For example, a parabolic waveform which repeats at the vertical rate of the television system, in synchronism with the vertical scanning of the cameras, may be used. If this waveform is added to voltage level 78, the result will be to displace the top and bottom portions of the image from the left camera to the right, without displacing the part of the image that is central in the vertical dimension.

If the same waveform with its polarity inverted is added to voltage level 80 the top and bottom portions of the image from the right camera will be displaced to the left, with the center part being unmoved.

In this way it is possible to correct for the distortion shown at 95 in FIG. 5c, by causing points 97 and 98 and likewise points 99 and 100, to coincide without affecting point 96.

Similarly waveforms of sawtooth shape at the vertical scanning rate may be used. Addition of sawtooth waveforms to voltage levels 78 and 80 will cause points near the top of the images to move in one direction and points near the bottom to move in the opposite direction, again without affecting points that are central in the vertical dimension. Sawtooth waveforms may be used, either with the parabolic waveforms, or separately, to correct distortions causing a greater or lesser horizontal separation as between the top and bottom of the two images. For example, if the separations of points 97 and 98 and points 99 and 100 are not precisely equal, sawtooth and parabolic waveforms may be used to effect coincidence of both pairs of points in the combined image. Other waveforms which may be used to produce coincidence of distorted images at any desired number of points along the junction line will readily occur to those skilled in the art.

Figure 6:
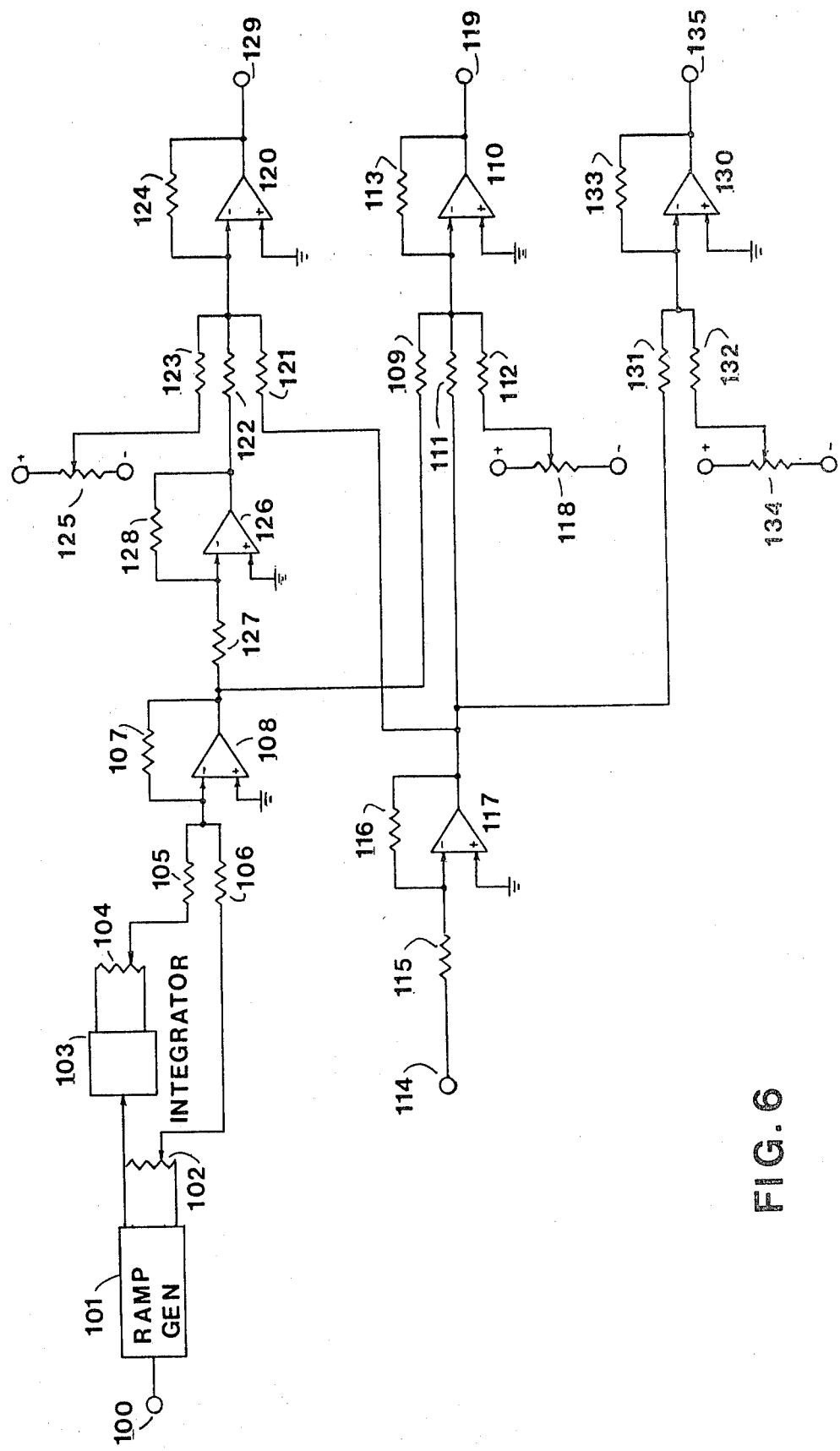
FIG. 6 is a block diagram showing one method of implementation of a means for correcting distortions in television camera images.

One possible form for the distortion corrector, shown at 17 in FIG. 1, which incorporates the parabolic and sawtooth waveforms of the above description and additionally includes means for introducing separate overall horizontal displacements of the images from the two cameras, and provides the control inputs required at terminals 40, 41, and 61 of FIG. 3 for operation of the displacement generator of which FIG. 3 is a block diagram, is illustrated in the block diagram of FIG. 6.

A vertical synchronizing pulse, such as that appearing at terminal 73 of FIG. 3, is applied to terminal 100, from which it is fed to ramp generator 101, of conventional design. Generator 101 produces a sawtooth waveform at vertical rate, which appears with opposite polarities at its two output terminals. These waveforms are fed to potentiometer 102. Adjustment of this potentiometer enables selection of a variable proportion of the sawtooth waveform, with either polarity.

An output of sawtooth generator 101 is fed to integrator 103, also of conventional design, which produces a parabolic output waveform. This also appears with opposite polarities at the two output terminals. These are fed to potentiometer 104, which similarly can be adjusted to select a variable proportion of the parabolic waveform with either polarity.

The outputs of potentiometers 102 and 104 are supplied, by way of resistors 105 and 106, to the negative (or inverting) input of operational amplifier 108. The positive (noninverting) input of this amplifier is connected to ground. A feedback resistor, 107, is connected from the output to the negative input. With this connection, as is well known, the output will consist of the sum of proportions of the input signals inverted in polarity, the proportions being determined by the relative values of resistors 105, 106, 107. For the present purpose these resistors may be equal.

The output of amplifier 108 is fed by way of resistor 109 to amplifier 110, which is similar to amplifier 108 except that provision is made for three inputs, through resistors 109, 111, 112 respectively. Resistor 113 is the feedback resistor associated with amplifier 110.

The control voltage, which determines the overall horizontal displacement of the combined image, the derivation of which is described subsequently, is applied to terminal 114. It is then applied by way of resistor 115 to amplifier 117 which is similar to amplifier 108 except that only one input is provided for. Resistor 116 is the feedback resistor associated with amplifier 117. By making resistors 115 and 116 equal the output of amplifier 117 will have the same magnitude as the voltage applied to terminal 114, but of opposite polarity.

The output of amplifier 117 is fed by way of resistor 111 to amplifier 110. Also fed to amplifier 110 by way of resistor 112 is the output of potentiometer 118. The output of amplifier 110 will thus consist of a summation of the input control voltage (from terminal 114 by way of amplifier 117), the adjustable d.c. voltage from potentiometer 118 (inverted in polarity by amplifier 110), and the output of amplifier 108 (also inverted in polarity). The input control voltage, having passed through two inverting amplifiers 117 and 110 appears at the output with its original polarity.

The output of amplifier 110 is fed to terminal 119 from whence it may be applied to terminal 40 of FIG. 3.

The output of amplifier 117 similarly feeds amplifier 120, (through resistor 121), whose circuit configuration is identical to that of amplifier 110, having three input resistors 121, 122, 123 and feedback resistor 124. Potentiometer 125 provides another input to amplifier 120 through resistor 123. The third input is taken from the output of amplifier 126, through resistor 122.

Amplifier 126 is connected similarly to amplifier 117, such that its output is of the same magnitude but opposite polarity to its input, which is taken from amplifier 108 through resistor 127. Resistor 128 is the feedback resistor for amplifier 126. The output of amplifier 120 thus consists of a summation of the input control voltage at terminal 114 (with its original polarity), the output of amplifier 108 with its original polarity (having passed through two inverting amplifiers), and the output of potentiometer 125 with inverted polarity. The output of amplifier 120 feeds terminal 129 from whence it may be fed to terminal 41 of FIG. 3.

As previously described the voltages applied to terminals 40 and 41 of FIG. 3 control the horizontal displacements of the images from the two cameras 1 and 2 of FIG. 1. Accordingly the circuit configuration of FIG. 6 will result in the input control voltage at terminal 114 producing equal horizontal displacements, in the same direction, of the images from the two cameras, and therefore provides control of the horizontal displacement of the combined image as a whole. This input control voltage may be derived from the marker detector to be described subsequently.

The configuration of FIG. 6 also enables the images from the two cameras to be individually displaced horizontally by the adjustment of potentiometers 118 and 125, so that they may be positioned to correspond at the junction line at which switching from one camera signal to the other occurs.

The configuration of FIG. 6 also enables adjustable proportions of sawtooth and parabolic waveforms at vertical scanning rate to be combined, and applied to cause horizontal displacements of the two camera images. Thus correction may be made for distortions of the camera images to obtain correspondence along the full height of the junction line.

Also included in the configuration of FIG. 6 is amplifier 130, with associated resistors 131, 132, 133. One input, through resistor 131, is obtained from the output of amplifier 117, and the other input, through resistor 132, is taken from potentiometer 134. Resistor 133 is the feedback resistor for amplifier 130. The output of amplifier 130 thus consists of the input control voltage at terminal 114, (with its original polarity), plus a voltage dependent on the setting of potentiometer 134 (with inverted polarity). This output is fed to terminal 135 from whence it may be fed to terminal 61 of FIG. 3, the voltage at which controls the timing of the switching action between the two camera signals.

Thus the timing of this switching will also follow the control input at terminal 114, and will therefore follow, in time, the displacements of the two camera images. Thus switching will always occur at a time in the camera output signals corresponding to a specific vertical line in the camera's field of view. The position of this line can be adjusted by potentiometer 134.

The preceding description has shown how a background image may be formed by combination of the television signals from two cameras or other video sources, which image can be displaced as a whole by the action of a control voltage. This capability may be used independently of the subsequent parts of this invention, or the use of chroma-key technique, if desired.

In order that the background image should follow the motions of a separate camera viewing a separate foreground scene, it is necessary that a control voltage should be generated which will follow the motion of the camera, and that this control voltage should be supplied to a point in a system, such as terminal 114 of FIG. 6 in the system described above, which will cause a displacement of the background image.

One way to generate a control voltage for use with the previously described parts of this invention is to mount a potentiometer adjacent to the camera viewing the foreground scene, mechanically connected to the camera such that the rotation of the shaft of the potentiometer is equal to, or in a fixed ratio to, the rotation of the camera about the axis which it is desired to follow. Horizontal motion of the background image can be made to follow panning of the foreground camera by arranging for the rotation of the aforementioned potentiometer to follow rotation of the camera about a vertical axis. Similarly vertical motion of the background image can follow tilting of the foreground camera by having a potentiometer follow rotation of the camera about its tilt axis.

Methods of mechanically connecting the shaft of a potentiometer to follow the rotation of a camera will be apparent to those cognizant of mechanical design.

A preferred method of generating the required control voltage, which forms a further part of this invention, will now be described. This method requires no mechanical connection to the camera, but operates from the television signal generated by the camera. It may accordingly be used with any form of television signal source, or from a recording of the signal from a television camera or other video source.

Since this method employs electronic circuit techniques similar in part to the circuit techniques employed for the chroma-key combination of foreground and background images, it may in practice be possible to employ common circuits for some of the functions required for the generation of the control voltage and the performance of the chroma-key function; however this invention may be implemented independently of chroma-key circuits and may be used with any chroma-key equipment.

It has been explained that conventional chroma-key technique involves placing the foreground subject in front of a backing of a particular color. The circuits employed to detect this color are normally designed to respond over a range of brightness levels having the same hue, in order that the equipment should not be unduly critical of variations in the brightness of the backing. Similarly the circuits are normally designed to respond over a range of hues, and a range of saturation of those hues, close to those selected by the operator of the equipment in order not to be excessively critical of variations in these parameters.

Accordingly it is normally permissible to paint the backing in different shades of a color, that is in colors having approximately the same hue but different brightness and/or saturation, to which the chroma-key circuits will respond as if they were all one color.

According to this invention, one part of the backing may be painted in one shade of a color and another part, or parts, of the backing may be painted in a different shade of the same or a similar color, the boundary or boundaries between the parts being vertical or horizontal or both. Alternatively two different distinct colors may be used, and chroma-key circuits may be designed that respond equally to either color.

Preferably the areas of different color should have no more than two boundaries between them in either the horizontal or vertical directions so that in the output of the camera viewing the backing there will be no more than one transition from the first color to the second color and one transition from the second color to the first color, in each direction. Such transitions can be simply distinguished. If more than one transition of a kind, for example from the first color to the second color in a vertical direction, were allowed it would be difficult to distinguish between them and relate them to the boundaries between the colors of the backing without ambiguity.

Possible configurations for the differently colored areas of the backing meeting the above requirement will be readily apparent. One example is shown in FIG. 1 comprising a vertical stripe, 13, of one color, with areas, 12, of the other color on either side. Alternatively part of the backing could be of one color and the remainder of the other color with a single vertical boundary between them.

Similar configurations can be used with the boundaries oriented horizontally when the methods of this invention are to be employed to cause a background image to follow tilting motions of the camera.

Configurations having both vertical and horizontal boundaries may similarly be employed when the methods of this invention are to be applied to cause a background image to follow both panning and tilting motions of a foreground camera.

It will be clear that when any of these configurations is viewed by a color television camera, the output signal from the camera will change at the boundaries between the two colors of the backing. This change may be detected and its position, either horizontally or vertically, within the camera image determined by electronic means, one example of which is described below. The positions of the boundaries within the camera image will of course change when the camera is panned (or tilted, in the case where a vertical position is being determined), so that they may be used as markers indicative of panning (or tilting) of the camera.

In normal use there will be a foreground subject in front of the backing. When chroma-key techniques are employed it is necessary to avoid the occurrence of the backing color in the foreground subject. For this application both the colors used for the backing should not be present in the foreground subject. To avoid being unduly restrictive on the foreground subject it is preferable to make these colors distinct shades of a similar hue. Frequently blue is employed as the backing color for chroma-key use; in this application the two colors could, for example, be dark blue and light blue. Other colors, in distinct shades, may of course be used.

The presence of a foreground subject in front of the backing may obscure part of the boundary between the two colors. Provided that part of the boundary remains visible to the camera it is possible to determine its position in the camera image. Use of backing configurations including more than one boundary, as, for example, stripe 13 of FIG. 1 provides less possibility of boundary obscuration; the visibility of a part of either boundary is sufficient to determine panning of the camera.

One method of implementation of a detector, to detect and determine the positions of the transitions between the two colors in the backing, as they appear in the image formed by a television camera, such as that shown at 14 in FIG. 1, and to generate a control signal corresponding to the positions of these transitions, which may be employed to perform the functions of the marker detector previously referred to in connection with FIG. 1, where it is indicated at 18, will now be described. It will be understood that other methods of performing this function are possible and will be apparent to those skilled in the art, and that the operation of this invention is not restricted to the use of the particular circuit configuration to be described. While this description in particular relates to the determination of camera panning, using a backing containing one or more vertical boundaries, it will be readily apparent that, by the interchange of the horizontal and vertical functions in the configuration to be described, camera tilt may be determined, and that, by a combination of the circuits so modified to determine tilt with the circuits described to determine panning, both these camera motions may be determined.

The output signal from a color television camera is normally encoded in accordance with one of the standard forms employed in television broadcasting, such as the standard known as NTSC used in the United States and elsewhere, or the standard known as PAL used in many European and other countries. Such encoded signals may be decoded into separate red, green, and blue signals by known means. Where available, red, green, and blue camera signals may be used directly and the luminance signal referred to below derived by known means.

Figure 7:
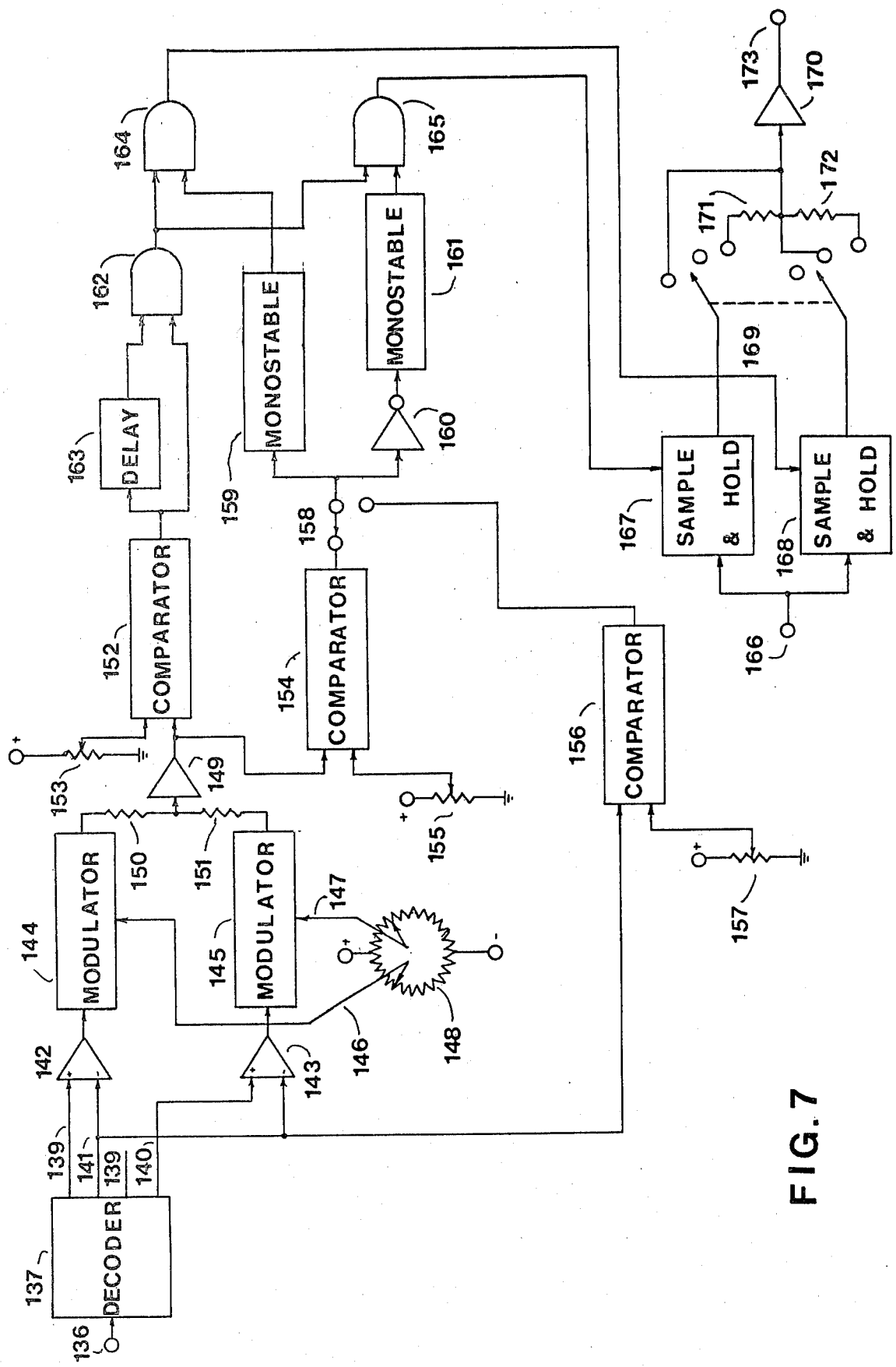
FIG. 7 is a block diagram showing one method of implementation of a means for detecting motion of a television camera.

Referring to FIG. 7, the encoded signal from a camera is applied at terminal 136, from which it is fed to decoder 137 which separates it into red, green, and blue signals 138, 139, 140 respectively. A luminance signal, representing the brightness of the image, sometimes known as the Y signal, is also produced by the decoder at 141. The design and functioning of such a decoder is known art.

For this application no use is made of the green signal output of the decoder, 139. The red signal output 138 and the luminance output 141 are supplied to difference amplifier 142, at the output of which appears the difference R-Y, where R represents the red signal and Y represents the luminance signal.

The blue signal output 140 and the luminance signal 141 are supplied to difference amplifier 143, similar to amplifier 142, whose output is B-Y, where B represents the blue signal, and Y the luminance signal as before.

The R-Y signal from difference amplifier 142 is fed to modulator 144, and the B-Y signal from difference amplifier 143 is fed to modulator 145.

Modulators 144 and 145 are such that their outputs represent the product of the input signal and the amplitude of a control voltage, which may be either positive or negative. Such modulators are commercially available as integrated circuits, for example type LM1496 manufactured by National Semiconductor Corporation.

Control voltages 146 and 147 are supplied to modulators 144 and 145 respectively. It is convenient, although not essential, that these control voltages should be functions of a common variable. One method of obtaining such voltages is the use of a dual-ganged potentiometer, providing two simultaneously variable voltages, one of which, for example, may be proportional to the sine of the rotation angle, and the other proportional to the cosine of this angle. Such a potentiometer is shown at 148. Other methods of obtaining suitable functions of a common variable, such as a control voltage, will be apparent to those skilled in the art.

The outputs of modulators 144 and 145 are summed together by resistors 150, 151 and amplifier 149. The output of this amplifier is accordingly $$(R-Y) \sin \theta + (B-Y) \cos \theta$$

where $\theta$ represents the angle of rotation of potentiometer 148.

It will be understood by those familiar with color television that the result of combining adjustable proportions of the R-Y signal and the B-Y signal, as appears at the output of amplifier 149, is a signal which will have its maximum positive value for a particular color in the scene, the choice of this color being determined by the value of $\theta$ above, which in turn is determined by the rotation of potentiometer 148.

The use of the equipment can accordingly set potentiometer 148 so that the color chosen for the backing produces the maximum positive signal at the output of amplifier 149. Where the backing includes two shades of the same color, or two colors differing only slightly, for example a greenish-blue and a reddish-blue, the potentiometer 148 can still be set so that both colors result in a positive output from amplifier 149.

The output of amplifier 149 feeds comparator 152 whose output will be at a high voltage level when the input exceeds the reference input, derived from potentiometer 153. This will occur when the output of amplifier 149 is positive and greater than the voltage from potentiometer 153. From the foregoing description it will be apparent that this occurs when the color in the scene viewed by the camera is that particular color (in practice the color of the backing) for which potentiometer 148 has been set to result in a positive output from amplifier 149, and when the magnitude of this output, which increases with the magnitude of the signals (R-Y) and (B-Y) which is dependent on the saturation of the color, that is the extent to which it departs from a colorless (black, white or gray) condition, exceeds the magnitude of the reference voltage from potentiometer 153. By appropriate adjustment of potentiometers 148 and 153 it can be arranged that the output of comparator 152 will be at its high level for both shades of the backing color previously referred to.

It may be noted that the output of comparator 152 is of the form required to perform the chroma-key function of substituting a background image for those parts of the foreground camera image where the backdrop color appears, and it may be used for this purpose by the provision of a suitable electronic switch to select between the foreground image and the background image.

Alternatively comparator 152 and potentiometer 153 may be omitted and the control signal from a separate chroma-key equipment, that is the signal indicative of the occurrence of the backdrop color, supplied in place of the output of comparator 152.

The output of amplifier 149 is also taken to a second comparator 154, with a reference voltage input provided by potentiometer 155.

The voltage output of potentiometer 155 may be set so that comparator 154 will only produce a high voltage level at its output when one of the two backing colors, whichever is more saturated, occurs in the camera signal. This is possible since the magnitudes of the signals (R-Y) and (B-Y), from which the input to comparator 154 is derived, are functions of the saturation of the color viewed by the camera.

The luminance signal 141 may also be supplied to another comparator 156, with a reference voltage input from potentiometer 157. This may be set so that the output of comparator 156 is at its high voltage level for one of the two backing colors, but not the other, whichever has the higher brightness.

The distinction between the two colors of the backing may thus be made either on the basis of their difference in saturation, by selection of the output of comparator 154, or on the basis of their difference in brightness, by selection of the output of comparator 156. A switch 158 may be provided so that the user may select either of these conditions.

The signal selected by switch 158 which indicates the transition from the first color to the second color in the backing is fed to the trigger input of monostable multivibrator 159. This generates a short output pulse whenever its input changes from a low voltage state to a high voltage state. The signal from switch 158 is also fed to inverter 160 and thence to a second monostable multivibrator 161, identical to that at 159. This will accordingly generate a short pulse whenever the signal from switch 158 changes from a high state to a low state. Thus one of the monostable multivibrators 159 or 161 will generate a pulse when the color changes from the first color to the second color and the other when a color change occurs in the opposite sense.

However transitions at the output of switch 158 may also occur when the signal from the camera is changing from the foreground subject to the backing color, and, when the signal from the luminance comparator 156 is selected by switch 158, when changes of luminance occur within the foreground subject. Either of these conditions will cause a pulse to be generated by one or other monostable multivibrator 159 or 161. Such pulses, which bear no relation to the transitions between the colors in the backing, are undesirable for the purpose of this invention.

Accordingly, the output of comparator 152, which indicates that the camera signal corresponds to the backing area, is fed to one input of logic AND gate 162. The output of comparator 152 is also fed to delay line 163, the output of which feeds the other input of gate 162. The delay introduced by delay line 163 is made slightly longer than the duration of the pulses generated by monostable multivibrators 159 and 161. The result is that the output of gate 162 will be at its low state whenever the output of comparator 152 is in its low state, that is at those times when the camera signal does not correspond to the backing. When the camera signal changes from the foreground subject to the backing the output of comparator 152 will change to its high state, however the output of gate 162 will not change to its high state until a time determined by delay 163. Since this is longer than the pulse widths generated by monostable multivibrators 159 and 161, the pulse generated by the transition from the foreground subject to backing will have ended before the output of gate 162 goes to its high state.

The outputs of monostable multivibrators 159 and 161 are fed to one input of logic AND gates 164 and 165 respectively. The output of gate 162 is fed to the other input of both gates 164 and 165. Accordingly these gates will only pass the pulses from multivibrators 159 and 161 when they occur in the backing area and also not at the time of transition from the foreground subject to backing in the camera signal.

A sawtooth waveform at the horizontal scanning rate, such as that at terminal 72 in FIG. 3, is applied to terminal 166. From thence it is fed to the inputs of two sample-and-hold circuits 167 and 168.

The output of gates 164 and 165 are applied to the sample pulse inputs of sample-and-hold circuits 167 and 168 respectively.

Accordingly the sample-and-hold circuits will sample the voltage of the sawtooth waveform at the times when transitions occur between the two backing colors in the camera signal and will then hold the voltage so obtained until the next such transition occurs. Since the voltage of the sawtooth waveform varies linearly in synchronism with the horizontal scanning of the camera the outputs of the sample-and-hold circuits 167 and 168 are voltages representative of the positions of the transitions between the two backing colors in the camera image; one output corresponding to transitions from the first color to the second color, and the other output corresponding to transitions from the second color to the first color.

The outputs of sample-and-hold circuits 167 and 168 are fed to switch 169. The setting of this switch depends on the type of the backing configurations employed and on which color, in the backing, has the greater saturation or luminance. When there is only one boundary between the two colors of the backing and the color on the right has the higher saturation or luminance, switch 169 should be set to its first position as shown. In this case the output of sample-and-hold 168 is not used, and the output of sample-and-hold 167 is fed to amplifier 170. However if the color on the left has the higher saturation or brightness, the switch should be set to its middle position, and the output of sample-and-hold 168 is then supplied to amplifier 170.

When a configuration such as that shown at 11 in FIG. 1 having a vertical stripe 13 of one color bounded on either side by an area 12 of a second color is employed there will be one transition in one direction and one transition in the opposite direction. The average of the positions of these two transitions corresponds to the center of the stripe, 13. Accordingly switch 169 should be set to its lower position, which causes the average of the outputs of the two sample-and-hold circuits 167 and 168 to be derived by means of resistors 171 and 172 and applied to the input of amplifier 170.

The output of amplifier 170 appears at terminal 173. This output is a voltage representative of the position of the center of the backing in the image formed by the foreground camera. It will respond to panning of the camera, and is suitable for use as the control voltage to determine horizontal displacement of the combined background image, to be applied to terminal 114 of FIG. 6.

By the substitution of 'vertical' for 'horizontal' in the above description, together with the use of a backing configuration having a horizontal boundary or boundaries between two colors, the system shown in FIG. 7 may be made responsive to tilting of the camera; and by a combination of the two approaches, a system may be constructed which will respond to both panning and tilting of the camera.

Since the method described above detects panning (and/or tilting) of the camera without requiring any mechanical interface with the camera it may also be applied to a recording of the camera signal.

A further feature of this invention is a method whereby a background image which will follow panning of a foreground camera may be derived from a single camera which views an area of the background scene greater than that which appears in the final image at any one time. The signal from this camera may be recorded if desired and subsequently reproduced.

Normally a video signal, when displayed on a television screen, will produce an image of the whole area viewed by the camera. It is required to display only part of this area to permit displacement of the image to reveal parts of the background scene not previously visible, at one or other side.

This may be achieved, where horizontal displacements of the image are to be effected, by equipping the background camera with an anamorphic lens, of the type used in the motion-picture industry for the production of wide-angle images, which compresses the image in the horizontal direction. A simpler method to compress the image horizontally is to change the aspect ratio of the scanning of the television camera such that the ratio of width to height of the area scanned is greater than the standard ratio of 4:3 used in television broadcasting. As an alternative the camera may view a photograph or motion-picture which has been horizontally compressed.

A portion of the image may now be selected and its aspect ratio restored to normal by the use of a device capable of storing the video signal from the camera corresponding to one horizontal line of the television image. Such devices are available in the form of integrated circuits, for example type CCD 321A manufactured by Fairchild Camera and Instrument Corporation. The signal is extracted from this storage device at a slower rate than the rate at which it was originally entered into the device. The result is to spread the signal to occupy a longer time than its original duration, which produces the effect, when displayed, of increasing the width of objects in the image. Since the duration of a line of the television image is fixed, only part of the signal originally stored in the device can be extracted at this slower rate in the time of one line, the remainder of the signal, corresponding to those areas viewed by the camera which are not to appear in the final background image, is discarded. By selection of the section of the originally stored line which is extracted, a controllable horizontal displacement of the image can be produced, with objects previously not visible (the previously discarded part of the signal) becoming included at the left or right sides, thus continuing to provide a background image filling the full width of a television screen.

It will be apparent to those skilled in the art that, since the resolution and bandwidth of television cameras is limited, as is the bandwidth of video recorders if used, the horizontal expansion of a video signal by the method outlined above will result in a final image in which the horizontal resolution is less than that of an unmmodified image from the camera. However the resolution and bandwidth capabilities of television cameras typically exceed the maximum bandwidth permitted to be transmitted by the standards presently used for television broadcasting so that the reduction in horizontal resolution referred to will not be apparent when the image is finally displayed on a television receiver, provided that the extent of horizontal expansion of the video signal is not excessive. For this reason use of this method is preferably confined to situations where the background image is required to follow only a moderate angle of panning of the camera viewing the foreground scene; where larger panning angles are to be accommodated the use of the method described earlier, employing two background cameras, is preferred.

Where a restricted angle of panning is acceptable this approach offers a reduction in the equipment (cameras, video recorders and associated equipment) required to provide the background image, with an accompanying simplification in the use of this equipment.

This feature of this invention operates in accordance with the methods already described, that is it employs a backing for the foreground scene containing areas of two colors configured as described, with the marker detector as described, and those parts of the displacement generator described which are required to effect horizontal displacement of the image from one background source. Since only one background camera is employed, the switch for selecting between two camera signals and the distortion corrector are not needed.

A more detailed consideration of the requirements of this feature of this invention, together with an example of a method of implementation thereof, will now be given.

A type of storage device appropriate to the requirements of this invention is that known as shift register, wherein samples of input data are successively shifted from one storage element to the next by application of successive clock pulses. On arriving at the final storage element a sample appears at the output terminal of the device. Thus the samples supplied to the input appear at the output, in their original sequence, after the application of a number of clock pulses equal to the number of storage elements in the register. Clearly the time required for a specific sample to travel through the register is determined by the frequency of the clock pulses. Also if the clock pulses are interrupted the samples will remain in their respective storage elements in the register. If now the clock pulses are reinstated but at a lower frequency than before the interruption the samples will appear at the output at this lower rate.

Consequently if the video signal from the camera is sampled at a particular rate by a source of clock pulses and the samples applied to a shift register having a number or storage elements not greater than the total number of samples in one television line period, but at least equal to the number of samples required at the output, the same clock pulses as used to sample the signal being applied to the shift register, and if then the clock pulses are interrupted, the shift register will contain the video data corresponding to one television line, or to a portion thereof where the number of storage elements is less than the total number of samples in one line period.

If clock pulses are then applied at a lower frequency the samples will be delivered to the output at a correspondingly lower rate and the samples which initially occupied only a part of the time of one television line can be stretched to occupy a full television line at the output.

The device previously referred to by way of example, namely integrated circuit type CCD 321A, consists of a shift register which includes provision for sampling an incoming analog signal and storing the samples in analog form. Other methods of achieving this result using, for example, digital techniques will be apparent to those skilled in the art.

In order that the system should operate continuously duplicate shift registers are provided, one storing the data from one television line, the other providing a stretched output of data stored during the preceding line; the two registers alternating between these two functions.

Further, when the video signal from the camera is a color signal encoded in accordance with one of the broadcasting standards previously referred to, known as NTSC or PAL, it is necessary to decode this encoded signal and re-encode it before storing the data in the shift registers. This requirement arises because the color information is conveyed by a modulated subcarrier of a specific frequency. It will be appreciated that the process described above in which a signal occupying part of a television line period is stretched to occupy a full line period results in the period of any repetitive waveform in the signal being similarly stretched; that is its frequency will be reduced. Were an encoded color signal with standard subcarrier frequency to be subjected to this process the subcarrier would be shifted in frequency and would not be useable by standard television equipment.

Figure 8:
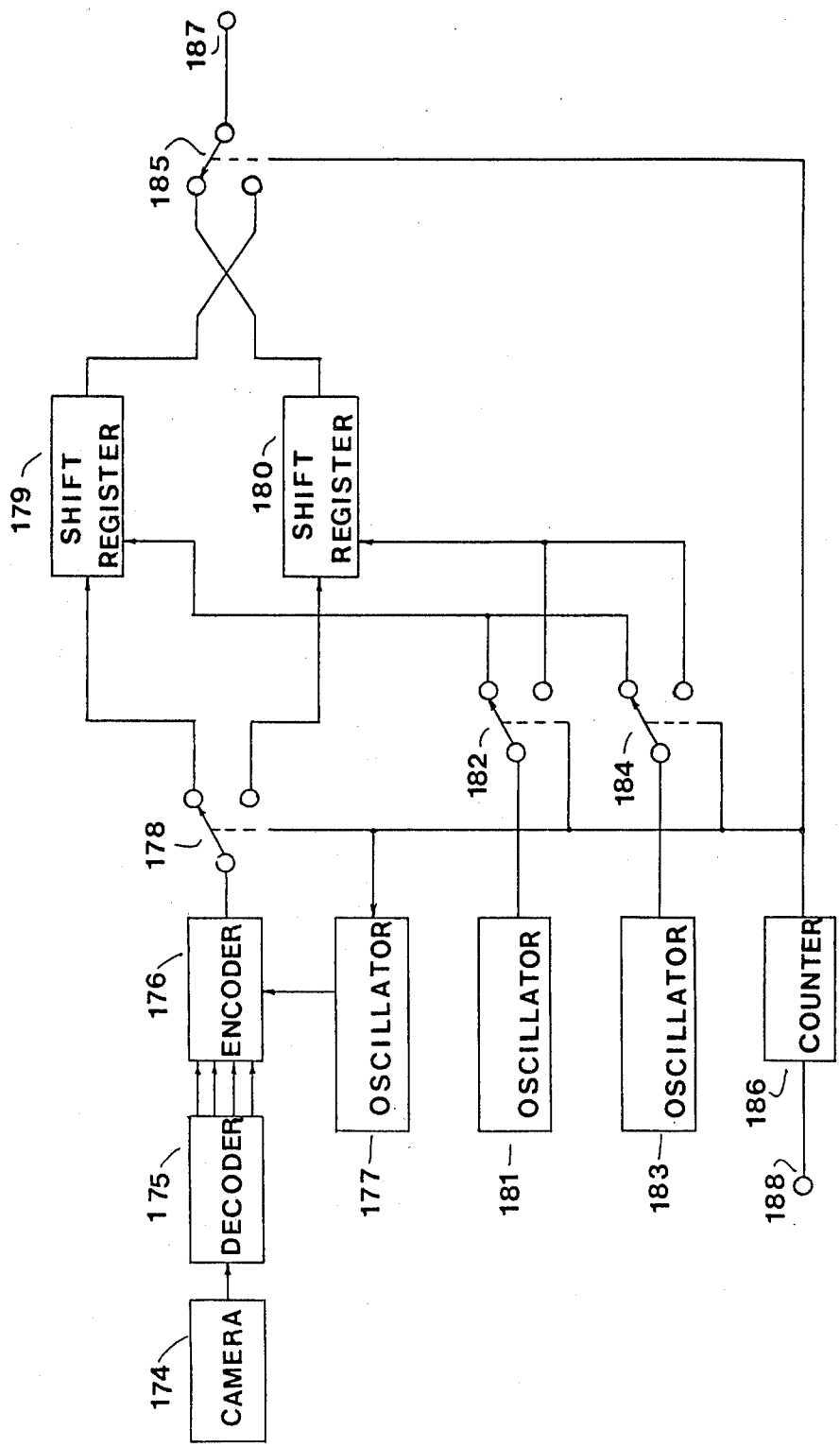
FIG. 8 is a block diagram showing one method of implementation of a means for horizontal expansion of television images.

This feature of this invention and one method of implementation thereof may be better understood by reference to FIG. 8. The video signal from a camera 174, which has been adjusted to have an aspect ratio greater than that normally used, or has been equipped with an anamorphic lens, or a recording of a video signal from such a camera, is applied to decoder 175, similar to decoder 137 in FIG. 7, which separates the encoded color signal from the camera into red, green, blue and luminance signals. These signals are then fed to encoder 176 which again combines them into an encoded signal similar in form to the input signal but in which the frequency of the subcarrier is higher than the standard subcarrier frequency. This higher frequency is supplied by oscillator 177, and is chosen so that its ratio to the input subcarrier frequency is equal to the ratio of the clock frequencies to be supplied to the shift registers when entering and when recovering the video data respectively. Thus at the output of the shift registers the subcarrier will again appear at its standard frequency. For example the clock frequency when entering the video data into the shift register might be chosen to be four times the standard subcarrier frequency. The clock frequency when recovering the data might be chosen to be 2.5 times the standard subcarrier frequency, giving a ratio by which the duration of the data will be stretched of 1.6. These values could be used with a camera the aspect ratio of which had been adjusted to 1.6 times its normal value. The frequency supplied by oscillator 177 would then be chosen to be 1.6 times the standard subcarrier frequency, and its phase would be adjusted for each line so that at the output of the shift registers the subcarrier would appear with correct phase.

The output of encoder 176 is supplied to electronic switch 178 which in one position feeds it to the input of shift register 179 and in the other position feeds it to the input of shift register 180.

Oscillator 181 supplies the clock pulses to be used when the data is entered into the shift registers. These pulses are fed to electronic switch 182 which in one position supplies the pulses to shift register 179 and in the other position to shift register 180. Similarly oscillator 183, having a lower frequency than oscillator 181, supplies the clock pulses to be used when retrieving data from the registers and electronic switch 184 supplies its output to one or other register 179 and 180.

The output of one or other register 179, 180 is selected by electronic switch 185. This signal is the expanded background video signal with normal aspect ratio, but without synchronizing pulses or color burst. This signal, shown at 187, is supplied as input to blanking and sync mixer 70 of FIG. 3 which inserts synchronizing pulses and color burst as previously described, to form a standard composite video signal for use as the background input to chroma-key equipment 9 of FIG. 1.

A counter 186 is fed with horizontal synchronizing pulses, supplied at 188, such as those appearing at one output of separator 36 of FIG. 3, and acts to divide the frequency of these pulses by two. Its output is supplied to electronic switches 178, 182, 184, 185 so as to cause them to change between their two states from one television line to the next. An output of counter 186 is also supplied to oscillator 177 to initialize its phase at the start of each line.

It can now be understood that the video signal input is alternately fed to registers 179, 180, on successive television lines, and the register to which this input is being fed is supplied with clock pulses from oscillator 181. Simultaneously clock pulses from oscillator 183 are supplied to the other register which outputs the data samples stored therein on the preceding line. Since the frequency of oscillator 183 is lower than that of oscillator 181 the samples will appear at the output at a lower rate than in the input video data, causing the output signal to have the form of the input signal but stretched in time. When displayed on a television screen this results in horizontal stretching of the image, thus correcting for the horizontal compression of the image from the background camera.

If registers 179, 180 are capable of storing a full television line of data, (as in the example of the integrated circuit type CCD 321A previously mentioned), then, since the output clock frequency is lower than the input clock frequency, only a part of the stored data will be retrieved, the remainder being discarded. (It may be noted that a shift register having fewer storage elements than the total number of samples in one line may be used; there is no virtue in storing samples which are subsequently discarded).

The part of the input signal which will appear in stretched form at the output, (with registers which store a full line of data), will commence with that part which was present at the input at the time when the electronic switch 178 changed state. In the period of one line this particular sample will be shifted through the entire length of the register and will appear at the output at the time when the electronic switches next change state. This sample will accordingly be the first to emerge when the data stored in this register is retrieved, and will be followed by as many samples as there are clock pulses from the output clock oscillator in one line period, that is until the electronic switches next change state.

Consequently by changing the timing of the signal from the background camera, (or the timing of the signal from a recorder reproducing the background camera signal, if used), by controlling the timing of its reference synchronizing pulses by the methods already described, it can be arranged that the output signal will commence with the sample corresponding to any desired horizontal position in the image generated by the camera. If the times at which the electronic switches change state are fixed in relation to the times of the synchronizing pulses from the television installation's common synchronizing pulse generator, (as would be the case if counter 186 of FIG. 8 is fed with the horizontal pulses from separator 36 of FIG. 3), the initial samples at the outputs of the shift registers will appear at a fixed point in the displayed image. A change in the timing of the signal from the background camera will consequently produce the effect of a horizontal displacement of the background image when displayed.

Consequently the method previously described for producing horizontal displacement of the background image is equally applicable in conjunction with this further feature of this invention employing a camera producing a horizontally compressed image and shift registers to produce a compensating expansion of a section of this image. That is those sections of displacement generator 16 of FIG. 1 which relate to one background camera are equally applicable where the system and circuits illustrated in FIG. 8 are included.

It will be apparent that inasmuch as the part of the input image which appears at the output can be selected by controlling the timing of the input video signal relative to the times at which the electronic switches change state, this selection can equally be made by controlling the times at which the electronic switches change state, with the timing of the input video signal being fixed. Thus an alternative method of implementation of this aspect of this invention consists in supplying counter 186 of FIG. 8 with pulses at horizontal rate the timing of which may be varied, such as exist at the output of pulse generator 42 in FIG. 3. The reference timing signal supplied to the background camera (or recorder if used) may then be taken directly from the common synchronizing pulse generator from which the input to terminal 34 of FIG. 3 is also derived. The circuits of the displacement generator, of which FIG. 3 is a block diagram of one possible implementation, will then control the times at which the electronic switches, 178, 182, 184 and 185 of FIG. 8, change state, and will thereby control the horizontal displacement of the image. Since this control will act in reverse sense to the effect of controlling the reference pulses to the camera, that is delaying the timing of the electronic switches results in displacement of the image to the left, it will be necessary in the complete system to invert the polarity of the control signal supplied to control terminal 40 of FIG. 3, or alternatively to invert the polarity of the waveform supplied from ramp generator 37 to comparator 38 in FIG. 3. Methods for inverting these signals will be obvious to those skilled in the art.

The preceding description has referred to the use of chroma-key techniques to create the appearance of a foreground subject appearing in front of a background scene which, where not obscured by the foreground, extends over the full area of the image.

Chroma-key techniques are also sometimes used to provide the appearance of a background scene observable through a window or other opening in the foreground image.

This effect is conventionally obtained by painting the area representing the window in the foreground scene in the particular color which the chroma-key equipment will detect, so that it will insert the background scene into this window area.

The methods already described may be employed with this application of chroma-key technique. The window area may be painted in two shades of color and the marker detector used to determine the position of the boundaries between them, as described. However if the window area is always to appear in the foreground image, and has vertical and horizontal boundaries, as for example, a rectangular area, a single color may be used and the marker detector employed to detect transitions to and from this color and the remainder of the foreground scene. This action is readily obtainable with the circuit of FIG. 7 by adjusting potentiometer 153 so that the output of comparator 152 is always high and potentiometer 155 so that the output of comparator 154 corresponds to the presence of the window color.

Since in this specific application there is no requirement to bring into view areas of the background scene not initially visible the background image may be obtained from a single camera with standard aspect ratio, the signal from which is then used directly without the need for horizontal expansion. Horizontal and, if desired, vertical displacement of the image is obtained by the use of a displacement generator as already described.

In the foregoing there have been described methods of generating a background image by the combination of the images from two television cameras, or other video sources, or recordings thereof; methods of displacing this combined image horizontally, or vertically, or both; methods of correcting for distortions of the images generated by the aforesaid cameras such as to obtain correspondence between them at the line at which they are joined to form the combined background image; methods of generating a background image by use of a single camera the image from which is compressed horizontally with electronic expansion of this image to normal form, and methods of horizontally displacing this image; methods of detecting the panning or tilting of a camera viewing a foreground scene, either at the time of occurrence or subsequently from a recording of the camera output, and generating a control voltage corresponding to such panning or tilting; and methods of applying this voltage to control the displacement of the background image in such a way that when the foreground image and the background image are then further combined, by means of the technique known as chroma-key, the appearance will be created that the subjects in the foreground scene are located in front of the background scene, which appearance will be preserved when motions are imparted to the camera viewing the foreground subjects, inasmuch as the background scene will be seen to move in the final image in such a way as to appear that it is being viewed by the camera which, in actuality, is viewing the foreground subjects.

While there have been illustrated and described various embodiments of the present invention it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. Apparatus for use with equipment producing a first television image, originating from a first television camera capable of being pointed in a variable direction so as to view differing parts of a foreground scene, said apparatus having the capability of producing a second television image formed by combination of parts of a pair of further images originating from a pair of further television cameras pointing in fixed directions so as to view different parts of a background scene, with horizontally displaced overlapping fields of view, said second television image moving coincident with, and corresponding to, horizontal motion of said first television image arising from change in the direction of viewing of said first television camera, in such manner that said first television image and said second television image may subsequently be combined, by the method of chroma-key, being known art, to form a combined image, said combined image then having the appearance of having been viewed by said first television camera, the position of objects portrayed in said combined image undergoing displacement in accordance with the horizontal motions of said first television camera, said displacement applying equally to that part of said combined image deriving from said first television camera capable of being pointed in a variable direction, and to that part of said combined image deriving from said second television image itself being derived from said further television cameras pointing in fixed directions, comprising:

a. means for sensing the direction of viewing of said first television camera, comprising a backing surface placed behind those parts of said foreground scene viewed by said first television camera, said backing surface having areas of a first color and an area of a second color different from said first color such as to cause said first television camera to generate two distinct and different values of its electrical output, the boundaries between said areas of said first color and said area of said second color being vertical lines, said boundaries performing the function of markers, the positions of said markers in the image formed by said first television camera being dependent on the direction of viewing of said first television camera, b. marker detector means for detecting transitions between said distinct and different values of said electrical output generated by said first television camera when viewing said first color and said second color, thereby detecting said markers, c. means for determining the positions within the image originating from said first television camera at which said transitions corresponding to said markers occur, and thereby producing indication of the direction of viewing of said first television camera, d. displacement generator means for generating displacements of the positions of said pair of further images originating from said pair of further television cameras, consisting of means for accepting a first reference signal having synchronizing pulses in accordance with standard television practice; means for generating a second reference signal likewise having synchronizing pulses in accordance with standard television practice; and means for effecting a controllable variable time delay between the synchronizing pulses of said second reference signal and the synchronizing pulses of said first reference signal, e. means for generating a pair of further reference signals also having synchronizing pulses in accordance with standard television practice, f. means for effecting individually changeable time delays between the synchronizing pulses of said pair of further reference signals and the synchronizing pulses of said second reference signal, g. means for supplying to each camera of said pair of further television cameras a timing signal, being a distinct one of said pair of further reference signals, in such manner that the timing of the synchronizing pulses of said timing signal controls the time at which said camera generates the electrical output signals corresponding to specific points in the scene viewed by said camera, h. means for controlling said controllable variable time delay between the synchronizing pulses of said second reference signal and the synchronizing pulses of said first reference signal by an amount dependent on the direction of viewing of said first television camera derived from the detection of the positions of said markers in the output of said first television camera, said amount being such that the variation in said time delay so produced results in a variation in the timing of the video output signals derived from said pair of further television cameras equal to the variation in the timing of the occurrence of said markers in the video output signal of said first television camera; whereby a displacement in the timing of said markers resulting from a motion of said first television camera will cause an equal displacement in the timing of the video output signals from said pair of further television cameras, i. means for setting said individually changeable time delays between the synchronizing pulses of said pair of further reference signals and the synchronizing pulses of said second reference signal such that the timings of each distinct one of said pair of further reference signals supplied to each one of said pair of further television cameras are such that, there being a first object viewed by the first one of said pair of further television cameras, being that camera placed to the left of the second one of said pair of further television cameras, said pair of further television cameras having horizontally overlapping fields of view, said first object being so positioned as to produce a video signal output from said first one of said pair of further television cameras at a time corresponding to the time of scanning of a part of the field of view close to the right side of the limit of the field of view of said first one of said pair of further television cameras, said first object being viewed by said second one of said pair of further television cameras then producing a video signal output from said second one of said pair of further television cameras at a time coincident with the time of production of the corresponding video signal output due to said first object from the first one of said pair of further television cameras; and conversely a second object being viewed close to the left limit of the field of view of said second one of said pair of further television cameras producing a video signal output coincident in time with the video signal output produced said second object when viewed by said first one of said pair of further television cameras; whereby said pair of further television cameras may have overlapping fields of view and the timings of said timing signals controlling the scannings of each of said pair of further television cameras may be so set that objects simultaneously appearing in the fields of view of both of said pair of further television cameras will produce video signal outputs coincident in time, j. means for generating a switch control signal so timed as to occur during the time of overlap of the fields of view of said pair of further television cameras such that said switch control signal will occur during the simultaneous presence of the video output signals from said first and second objects, both being viewed by both of said pair of further television cameras, in the video outputs of both of said pair of further television cameras, the timing of said switch control signal being directly related to the timings of said pair of further reference signals, said timings being set by way of said means for setting said individually changeable time delays such as to produce time coincidence of the video output signals from said pair of further television cameras deriving from objects within the overlapping fields of view of said pair of further television cameras, such as said first object and said second object, said switch control signal therefore being derivable from said pair of further reference signals by detection of the time of overlapping of the images of said pair of further television cameras; additionally means being provided to cause said switch control signal to be reset to its initial condition during the synchronizing pulses of said first reference signal; whereby the output of said first one of said pair of further television cameras will be selected following said synchronizing pulses of said first reference signal, being coincident with the start of scanning of a standard television display device on which the output of the system may be viewed, and k. means for switching between the video signal outputs of said pair of further television cameras controlled by said switch control signal such that only one of said video signal outputs is selected at any one time, the selection being performed at those times at which the video signal outputs from a single object appearing in the fields of view of both of said pair of further television cameras are coincident in time; whereby a single continuous video output signal corresponding to a field of view part of which is derived from one, and the remainder from the other, of said pair of further television cameras, may be derived.

2. Apparatus as recited in claim 1 wherein said pair of further television cameras have vertically overlapping fields of view; said boundaries between said areas having said first color and said second color being horizontal lines; said first one of said pair of further television cameras being placed above said second one of said pair of further television cameras; said first object producing a video signal output from said first one of said pair of further television cameras at a time corresponding to the time of scanning of a part of the field of view close to the bottom of the limit of the field of view of said first one of said pair of further television cameras, said first object being viewed by said second one of said pair of further television cameras then also producing a video signal output from said second one of said pair of further television cameras at a time coincident with the time of production of the corresponding video signal output due to said first object from the first one of said pair of further television cameras, and, conversely, said second object, being viewed close to the top limit of the field of view of said second one of said pair of further television cameras, producing a video signal output coincident in time with the video signal output produced by said second object when viewed by said first one of said pair of further television cameras; the magnitude of said variable time delay between the synchronizing pulses of said second reference signal and the synchronizing pulses of said first reference signal being sufficiently great, and being a multiple of the period of a horizontal television line, such that a displacement of said markers from one television line to another resulting from a vertical motion of said first television camera will cause a displacement of timing of the video output from said second television camera by a time equal to the time occupied by the number of television lines by which said markers have been displaced; whereby the apparatus will cause said second television image to move vertically coincident with and corresponding to vertical motions of said first television camera.

3. Apparatus as recited in claims 1 or 2 wherein the electrical signals generated by each of said pair of further television cameras are recorded and subsequently reproduced by a pair of reproducing means prior to being combined to form said second television image, and wherein means are provided for supplying to each of said pair of reproducing means a timing signal, being a distinct one of said pair of further reference signals in such manner that the timing of the synchronizing pulses of said timing signal controls the time at which said reproducing means reproduces the electrical signals corresponding to specific points in the scene viewed by that one of said pair of further television cameras the recorded electrical signals of which it is reproducing, and wherein said means for supplying a timing signal to each of said pair of reproducing means replaces said means for supplying a timing signal to each camera of said pair of further television cameras.

4. Apparatus as recited in claim 1 wherein said means for separately setting said individually changeable time delays between the synchronizing pulses of said pair of further reference signals includes distortion corrector means whereby said individually changeable time delays may be separately caused to change in opposing sense at a rate synchronous with the vertical synchronizing pulses of said first reference signal, whereby the relative horizontal displacement of the images originating from said pair of further television cameras may be caused to change during the vertical scanning period of said further television cameras, thus effecting correction for geometrical distortion of said images and providing time coincidence of said video signal outputs from said first and said second of said pair of further television cameras, deriving from said first object and said second object, both being viewed by both of said pair of further television cameras, independent of the vertical positions of said first object and said second object in the vertical fields of view of said pair of further television cameras.

5. Apparatus for use with equipment producing a first television image, originating from a first television camera capable of being pointed in a variable direction so as to view differing parts of a foreground scene, said apparatus having the capability of producing a second television image originating from a single second television camera pointing in a fixed direction so as to view a background scene, said second television image moving coincident with, and corresponding to, horizontal motion of said first television image arising from change in the direction of viewing of said first television camera, in such manner that said first television image and said second television image may subsequently be combined, by the method of chroma-key, being known art, to form a combined image, said combined image than having the appearance of having been viewed by said first television camera, the positions of objects portrayed in said combined image undergoing displacement in accordance with the horizontal motions of said first television camera, said displacement applying equally to that part of said combined image deriving from said first television camera capable of being pointed a variable direction, and to that part of said combined image deriving from said second television image itself originating from said second television camera pointing in a fixed direction, comprising:

a. means for sensing the direction of viewing of said first television camera, comprising a backing surface placed behind those parts of said foreground scene viewed by said first television camera, said backing surface having areas of a first color and an area of a second color different from said first color such as to cause said first television camera to generate two distinct and different values of its electrical output, the boundaries between said areas of said first color and said area of said second color being vertical lines, said boundaries performing the function of markers, the positions of said markers in the image formed by said first television camera being dependent on the direction of viewing of said first television camera, b. marker detector means for detecting transitions between said distinct and different values of said electrical output generated by said first television camera when viewing said first color and said second color, thereby detecting said markers, c. means for determining the positions within the image originating from said first television camera at which said transitions corresponding to said markers occur, and thereby producing indication of the direction of viewing of said first television camera, d. displacement generator means for generating displacement of the position of said second television image originating from said second television camera, consisting of means for accepting a first reference signal having synchronizing pulses in accordance with standard television practice; means for generating a second reference signal likewise having synchronizing pulses in accordance with standard television practice; and means for effecting a controllable variable time delay between the synchronizing pulses of said second reference signal and the synchronizing pulses of said first reference signal, e. means for supplying said second reference signal to said second television camera in such manner that the timing of the synchronizing pulses of said second reference signal controls the time at which said camera generates the electrical output signals corresponding to specific points in the scene viewed by said camera, and f. means for controlling said controllable variable time delay between the synchronizing pulses of said second reference signal and the synchronizing pulses of said first reference signal by an amount dependent on the direction of viewing of said first television camera derived from the detection of the positions of said markers in the output of said first television camera, said amount being such that the variation in said time delay so produced results in a variation in the timing of the video output signal derived from said second television camera equal to the variation in the timing of the occurrence of said markers in the video output signal of said first television camera; whereby a displacement in the timing of said markers resulting from a motion of said first television camera will cause an equal displacement in the timing of the video output signal from said second television camera, thus causing said output of said second television camera to follow in time, and thus in position when displayed on a television screen, any displacement of said markers resulting from motion of said first television camera.

6. Apparatus as recited in claim 22 wherein the image originating from said second television camera is compressed in the horizontal direction and wherein means are provided for effecting expansion in the horizontal direction of a selected part of said image, selection of said selected part being determined by said controllable variable time delay between said synchronizing pulses of said second reference signal and said synchronizing pulses of said first reference signal, whereby horizontal displacement of the content of said selected part of said image may be effected, said means for effecting expansion in the horizontal direction of a selected part of said image comprising:

a. a source of first clock pulses,
  b. a source of second clock pulses having a lower frequency than said first clock pulses,
  c. first and second storage means each capable of storing a plurality of samples of a television signal supplied to its input and subsequently providing said samples at its output in the sequence of supplying to said input, the temporal separation between said samples supplied to said input being determined by said first clock pulses and the temporal separation between said samples provided at said output being determined by said second clock pulses,
  d. means for producing a control voltage alternating between a first value maintained for a time equal to the time of scanning of one horizontal television line and a second value maintained for a like time,
  e. means for selecting between said output of said first storage means and said output of said second storage means to form a selected output, and
  f. means for supplying samples of a television signal being that signal originating from said second television camera and said first clock pulses to said first storage means and supplying said second clock pulses to said second storage means and selecting said output of said second storage means to form said selected output when said control voltage has said first value; and for supplying said samples of said television signal originating from said second television camera and said first clock pulses to said second storage means and supplying said second clock pulses to said first storage means and selecting said output of said first storage means to form said selected output when said control voltage has said second value; whereby said samples will alternately be stored in, and retrieved from, each of said first and second storage means, and whereby, consequent upon said second clock pulses having a lower frequency than said first clock pulses, the temporal separation of said samples provided at said outputs of said first and second storage means, and consequently at said selected output, will be greater than the temporal separation of said samples of said signal originating from said second television camera supplied to said first storage means and to said second storage means, resulting in said selected output being expanded in time by comparison with said signal originating from said second television camera, such temporal expansion then resulting in a horizontal expansion of the image when subsequently displayed on standard television display equipment.

7. Apparatus as recited in claim 5 wherein said second television image moves coincident with and corresponding to vertical motion of said first television image arising from change in the direction of viewing of said first television camera; said boundaries between said areas of said first color and said second color being horizontal lines; the magnitude of said variable time delay between the synchronizing pulses of said second reference signal and the synchronizing pulses of said first reference signal being sufficiently great, and being a multiple of the period of a horizontal television line, such that a displacement of said markers from one television line to another resulting from a vertical motion of said first television camera will cause a displacement of timing of the video output from said second television camera by a time equal to the time occupied by the number of television lines by which said markers have been displaced; whereby the apparatus will cause the positions of objects portrayed in said combined image to undergo displacement in accordance with the vertical motions of said first television camera, said displacement applying equally to that part of said combined image derived from said first television camera and to that part of said combined image derived from said second television camera.

8. Apparatus as recited in claims 5 or 7 wherein the electrical signal generated by said second television camera is recorded and subsequently reproduced by a reproducing means prior to being utilized to form said second television image and wherein means are provided for supplying said second reference signal to said reproducing means, in place of to said second television camera, in such manner that the timing of the synchronizing pulses of said second reference signal controls the time at which said reproducing means reproduces the electrical signals corresponding to specific points in the scene viewed by said second television camera.

9. Apparatus as recited in claims 1 or 5 wherein said means for controlling said controllable variable time delay comprises:
   a. means for generating a sawtooth waveform synchronous with the horizontal synchronizing pulses of said first reference signal,
   b. means for sampling the instantaneous value of the voltage of said sawtooth waveform with pulses coincident with transitions of one sense of said transitions between said distinct and different values of said electrical output generated by said first television camera when viewing said two different colors and retaining the voltage so sampled to form a control voltage,
   c. means for comparing the instantaneous value of the voltage of said sawtooth waveform with said control voltage and for generation of a comparison signal indicative of the greater of said instantaneous value and said control voltage, whereby a change in said comparison signal occurs at the time of equality of said instantaneous value and said control voltage,
   d. means for generating further synchronizing pulses in accordance with standard television practice,
   e. means whereby said change in said comparison signal controls said means for generating further synchronizing pulses causing the horizontal component of said further sychronizing pulses to coincide with said change in said comparison signal, and
   f. means for supplying said further synchronizing pulses to form the synchronizing pulses of said second reference signal, whereby the time delay of said second reference signal will be caused to vary by an amount corresponding to the variation in timing of said transitions of one sense.

10. Method and apparatus as recited in claim 9 wherein said sawtooth waveform is synchronous with the vertical synchronizing pulses of said first reference signal, and said change in said comparison signal controls said means for generating further synchronizing pulses causing the vertical component of said synchronizing pulses to coincide with said change in said comparison signal.

11. Apparatus for use with equipment producing a first television image, originating from a first television camera capable of being pointed in a variable direction so as to view differing parts of a foreground scene, said apparatus having the capability of producing a second television image originating from a single further television camera pointing in a fixed direction so as to view a background scene, the image originating from said further television camera being compressed in the horizontal direction and wherein means are provided for effecting expansion in the horizontal direction of a selected part of said image from said further television camera, said selected part of said image, having been expanded in the horizontal direction, forming said second television image, said second television image moving coincident with, and corresponding to, horizontal motion of said first television image arising from change in the direction of viewing of said first television camera, in such manner that said first television image and said second television image may subsequently by combined, by the method of chroma-key, being known art, to form a combined image, said combined image then having the appearance of having been viewed by said first television camera, the positions of objects portrayed in said combined image undergoing displacement in accordance with the horizontal motions of said first television camera, said displacement applying equally to that part of said combined image deriving from said first television camera capable of being pointed in a variable direction, and to that part of said combined image deriving from said second television image itself originating from said further television camera pointing in a fixed direction comprising:
   a. a backing surface placed behind those parts of said foreground scene viewed by said first television camera, said backing surface having areas of a first color and an area of a second color different from said first color such as to cause said first television camera to generate two distinct and different values of its electrical output, the boundaries between said areas of said first color and said area of said second color being vertical lines, said boundaries performing the function of markers the positions of said markers in the image formed by said first television camera being dependent on the direction of viewing of said first television camera,
   b. marker detector means for detecting transitions between said distinct and different values of said electrical output generated by said first television camera when viewing said first color and said second color thereby detecting said markers,
   c. means for determining the positions within the image originating from said first television camera at which said transitions corresponding to said markers occur, and thereby producing indication of the direction of viewing of said first television camera,
   d. displacement generator means for generating displacement of the position of said second television image originating from said further television camera, consisting of means for accepting a first reference signal having synchronizing pulses in accordance with standard television practice; means for generating a second reference signal likewise having synchronizing pulses in accordance with standard television practice; and means for effecting a controllable variable time delay between the synchronizing pulses of said second reference signal and said synchronizing pulses of said first reference signal,
   e. means for controlling said controllable variable time delay between the synchronizing pulses of said second reference signal and the synchronizing pulses of said first reference signal by an amount dependent on the direction of viewing of said first television camera derived from the detection of the positions of said markers in the output of said first television camera, and of such amplitude as to produce a variation in said time delay of magnitude proportional to any change in the times of occurrence of the signals produced by said markers in the output of said first television camera relative to previously obtaining times of occurrence of said signals produced by said markers, but having the opposite sense, a reduction in the amount of said time delay resulting from increase in the delay between the times of occurrence of said signals produced by said markers by comparison with previously obtaining times of occurrence of said signals produced by said markers, f. means for effecting expansion in the horizontal direction of a selected part of said image originating from said further television camera, including: a source of first clock pulses; a source of second clock pulses having a lower frequency than said first clock pulses; first and second storage means each capable of storing a plurality of samples of a television signal supplied to its input and subsequently providing said samples at its output in the sequence of supplying to said input, the temporal separation between said samples supplied to said input being determined by said first clock pulses and the temporal separation between said samples provided at said output being determined by said second clock pulses; means for selecting between said output of said first storage means and said output of said second storage means to form a selected output, g. means for producing a storage input control signal, being a pulse having a low value and a high value, the transition from said low value to said high value occurring during the time of said horizontal synchronizing pulses contained in said second reference signal, and the duration of said pulse being such as to permit a sufficient number of said first clock pulses to occur as to cause each of said first and second storage means, said first clock pulses being supplied thereto, to be filled to its storage capacity with said plurality of samples of a television signal supplied to its input, h. means for producing a storage output control signal alternating between a first value maintained for a time equal to the time between successive horizontal synchronizing pulses contained in said first reference signal, and a second value maintained for a like time, the transitions between said first value and said second value occurring during the time of said horizontal synchronizing pulses contained in said first reference signal, and i. means for supplying samples of a television signal being that signal originating from said further television camera and said first clock pulses to said first storage means when said storage input control signal has said high value and said storage output control signal has said first value and supplying said second clock pulses to said second storage means and selecting said output of said second storage means to form said selected output also when said storage output control signal has said first value; and for supplying said samples of said television signal originating from said further television camera and said first clock pulses to said second storage means when said storage input control signal has said high value and said storage output control signal has said second value and supplying said second clock pulses to said first storage means and selecting said output of said first storage means to form said selected output also when said storage output control signal has said second value; whereby said samples will alternately be stored in, and retrieved from, each of said first and second storage means, the times of commencement of storage being determined by the times of transition of said storage input control signal from said low value to said high value, said selected output forming the video signal capable of producing said second television image and whereby, consequent upon said second clock pulses having a lower frequency than said first clock pulses, the temporal separation of said samples provided at said outputs of said first and second storage means, and consequently at said selected output, will be greater than the temporal separation of said samples of said signal originating from said further television camera supplied to said first storage means and to said second storage means, resulting in said selected output being expanded in time by comparison with said signal originating from said further television camera, such temporal expansion then resulting in a horizontal expansion of the image when subsequently displayed on standard television display equipment, such that said second television image will have standard aspect ratio, the horizontal compression of the image originating from said further television camera being canceled by said horizontal expansion and whereby, consequent upon the timings of the transitions from said low value to said high value of said storage input control signal being dependent on the times of occurrence of said markers in the output of said first television camera, but in reversed sense, a retardation in the time of occurrence of said markers consequent upon a motion of said first television camera to the left will cause said storage input control signal to change state earlier thus commencing storage of the signal from said further television camera at an earlier time corresponding to the scanning of a part of the image of the background scene displaced to the left of that previously obtaining; thus a motion to the left of said first television camera will cause selection of a portion of said background scene to the left of that previously selected, and conversely motion to the right of said first television camera will cause selection of a portion of said background scene to the right of that previously selected, thus said second television image, being derived from the selected portion of the output of said further television camera, will move coincident with, and corresponding to, the motions of said first television image arising from motion of said first television camera.

12. Apparatus as recited in claim 11 wherein the electrical signal generated by said further television camera is recorded and subsequently reproduced by a reproducing means the output of said reproducing means being supplied to said means for supplying samples of a television signal to said first and second storage means in place of said signal originating from said further television camera.

13. Apparatus as recited in claim 11 wherein said means for controlling said controllable variable time delay comprises:

a. means for generating a sawtooth waveform synchronous with the horizontal synchronizing pulses of said first reference signal said sawtooth waveform including both negative and positive voltage parts and passing through zero voltage at a time occurring between said horizontal synchronizing pulses, b. means for sampling the instantaneous value of the voltage of said sawtooth waveform with sampling pulses coincident with transitions of one sense of said transitions between said distinct and different values of said electrical output generated by said further television camera when viewing said two different colors and retaining the voltage so sampled to form a control voltage, c. means for inverting the polarity of, and means for adjusting the amplitude of, said control voltage to form an inverted control voltage, d. means for comparing the instantaneous value of the voltage of said sawtooth waveform with said inverted control voltage and for generation of a comparison signal indicative of the greater of said instantaneous value and said inverted control voltage, whereby a change in said comparison signal occurs at the time of equality of said instantaneous value and said inverted control voltage, and whereby, in consequence of said means for inverting the polarity of said control voltage, a retardation of said sampling pulses will cause an advance in the time of said change in said comparison signal, and conversely an advance of said sampling pulses will cause a retardation in said time of said change in said comparison signal, the amount of alteration in said time of said change in said comparison signal being dependent on the adjustment of said means for adjusting the amplitude of said control voltage; coincidence of said sampling pulses with the time of said zero voltage of said sawtooth waveform resulting in coincidence of said change in said comparison signal with said sampling pulses, e. means for generating further synchronizing pulses in accordance with standard television practice, f. means whereby said change in said comparison signal controls said means for generating further synchronizing pulses causing the horizontal component of said further synchronizing pulses to coincide with said change in said comparison signal, and g. means for supplying said further synchronizing pulses to form the synchronizing pulses of said second reference signal, whereby the time of said transition from said low value to said high value of said storage input control signal becomes controlled by said time of said change in said comparison signal.

* * * * *